United States Patent
Bisht et al.

(10) Patent No.: US 9,118,713 B2
(45) Date of Patent: Aug. 25, 2015

(54) SYSTEM AND A METHOD FOR AUTOMATICALLY DETECTING SECURITY VULNERABILITIES IN CLIENT-SERVER APPLICATIONS

(71) Applicant: THE BOARD OF TRUSTEES OF THE UNIVERSITY OF ILLINOIS, Urbana, IL (US)

(72) Inventors: Prithvi Bisht, Wheeling, IL (US); Timothy Hinrichs, Chicago, IL (US); Venkatesan Natarajan Venkatakrishnan, Chicago, IL (US)

(73) Assignee: THE BOARD OF TRUSTEES OF THE UNIVERSITY OF ILLINOIS, Urbana, IL (US)

(*) Notice: Subject to any disclaimer, the term of this patent is extended or adjusted under 35 U.S.C. 154(b) by 88 days.

(21) Appl. No.: 13/627,928

(22) Filed: Sep. 26, 2012

(65) Prior Publication Data

US 2013/0091578 A1 Apr. 11, 2013

Related U.S. Application Data

(60) Provisional application No. 61/539,120, filed on Sep. 26, 2011.

(51) Int. Cl.
*G06F 11/00* (2006.01)
*H04L 29/06* (2006.01)
(Continued)

(52) U.S. Cl.
CPC ............ *H04L 63/1441* (2013.01); *G06F 21/53* (2013.01); *G06F 21/577* (2013.01); *G06F 2221/2149* (2013.01)

(58) Field of Classification Search
CPC ............ H04L 63/1416; H04L 63/1425; H04L 63/1433; H04L 63/1441; G06F 21/30; G06F 21/50; G06F 21/55; G06F 21/552; G06F 21/554; G06F 21/56; G06F 21/604
USPC ............... 726/22–25; 713/150–154, 193–194
See application file for complete search history.

(56) References Cited

U.S. PATENT DOCUMENTS 6,611,869 B1 * 8/2003 Eschelbeck et al. .......... 709/228
6,665,634 B2 * 12/2003 Taft et al. ..................... 702/186
(Continued)

OTHER PUBLICATIONS

Bisht, "NoTAMPER: Automatic, Blackbox Detection of Parameter Tampering Opportunities in Web Applications" To appear in 17th ACM Conference on Computer and Communications Secuirty (CCS 2010) Supplementary Website: http://sisl.rites.nic.edu/notamper.
(Continued)

*Primary Examiner* — Hosuk Song
(74) *Attorney, Agent, or Firm* — Michael Best & Friedrich LLP

(57) ABSTRACT

A method for automatically detecting security vulnerabilities in a client-server application where a client is connected to a server. The method is implemented by a computer having a processor and a software program stored on a non-transitory computer readable medium. The method includes automatically extracting, with the software program at the client, a description of one or more validation checks on inputs performed by the client. The method also includes analyzing the server, with the software program by using the one or more validation checks on inputs performed by the client, to determine whether the server is not performing validation checks that the server must be performing. The method further includes determining that security vulnerabilities in the client-server application exist when the server is not performing validation checks that the server must be performing. A method further proposes preventing parameter tampering attacks on a running client-server application by enforcing the one or more validation checks on inputs performed by the client on each input that is submitted to the server.

32 Claims, 14 Drawing Sheets

(51) Int. Cl.
  G06F 21/53  (2013.01)
  G06F 21/57  (2013.01)

(56) References Cited

U.S. PATENT DOCUMENTS

| | | | | |
|---|---|---|---|---|
| 6,931,550 | B2* | 8/2005 | Rygaard | 726/23 |
| 7,269,845 | B1* | 9/2007 | Rygaard et al. | 726/3 |
| 8,281,401 | B2* | 10/2012 | Pennington et al. | 726/25 |
| 8,453,125 | B2* | 5/2013 | Artzi et al. | 717/131 |
| 8,516,449 | B2* | 8/2013 | Artzi et al. | 717/127 |
| 8,584,120 | B2* | 11/2013 | Urbach | 717/178 |
| 2009/0044271 | A1* | 2/2009 | Benameur et al. | 726/22 |
| 2009/0300033 | A1* | 12/2009 | Pandit et al. | 707/100 |

OTHER PUBLICATIONS

Balzarotti, et al., "Saner: Composing Static and Dynamic Analysis to Validate Sanitization in Web Applications," In SP'08: Proceedings of the 29th IEEE Symposium on Security and Privacy (Oakland, California, USA, 2008).

Balzarotti, et al., "Multi-Module Vulnerability Analysis of Web-based Applications." In CCS'07: 14th ACM Conference on Computer and Communications Security (Alexandria, Virginia, USA, 2007).

Bandhakavi, et al., "CANDID: Preventing SQL Injection Attacks using Dynamic Candidate Evaluations." In CCS'07: Proceedings of the 14th ACM Conference on Computer and Communications security (Alexandria, USA, 2007).

Bille, P. "A survey on tree edit distance and related problems." Theoretical Computer Science 337, 1-3 (2005), 217-239.

Bisht, et al., "Automatically Preparing Safe SQL Queries." In FC'10: Proceedings of the 14th International Conference on Financial Cryptography and Data Security (Tenerife, Canary Islands, Spain, 2010).

Brumley, et al., "Towards Automatic Discovery of Deviations in Binary Implementations with Applications to Error Detection and Fingerprint Generation." In SS'01: Proceedings of 16th USENIX Security Symposium (Berkeley, California, USA, 2007).

Chong, et al., "Secure Web Application via Automatic Partitioning." SIGOPS Oper: Syst. Rev. 41, 6 (2007), 31-44.

Godefroid, et al., "DART: Directed Automated Random Testing," SIGPLAN Not. 40, 6 (2005), 213-223.

Godefroid, et al., "Automated Whitebox Fuzz Testing." In NDSS'08: Proceedings of the 16th Amwal Network and Distributed System Security Symposium (San Diego, California, USA, 2008).

Grier, et al., "Secure Web Browsing With the OP Web Browser." In SP'08: Proceedings of the 29th IEEE Symposium on Security and Privacy (Oakland, California, USA, 2008).

Halfond, et al., "Classification of SQL-Injection Attacks and Countermeasures." In ISSE'06: Proceedings of the International Symposium on Secure Software Engineering (Washington, DC, USA, 2006).

Kiezun, et al., "A Solver for String Constraints." In ISSTA '09: Proceedings of the 18th international symposium on Software testing and analysis (Chicago, Illinois, USA, 2009).

Livshits, et al., "Finding Security Vulnerabilities in Java Applications with Static Analysis." In SS'05: Proceedings of the 14th USENIX Security Symposium (Baltimore, Maryland, USA, 2005).

Newsome, et al., "Automatic Protocol Replay by Binary Analysis." In CCS'06: Proceedings of the 13th ACM conference on Computer and communications security (Alexandria, Virginia, USA, 2006).

Ratcliff, et al., "Pattern Matching: The Gestalt Approach." Dr: Dobbs Journal (Jul. 1988), 46-47, 49-51,68-72.

Reis, et al., "Isolating Web Programs in Modern Browser Architectures." In EuroSys'09: Proceedings of the 4th ACM European conference on Computer systems (Nuremberg, Germany, 2009).

Saxena, et al., "A Symbolic Execution Framework for JavaScript." In SP'10: Proceedings of the 31st IEEE Symposium on Security and Privacy (Oakland, California, USA, 2010).

Saxena, et al., "FLAX: Systematic Discovery of Client-side Validation Vulnerabilities in Rich Web Applications." In NDSS'10: Proceedings of the 17th Annual Network and Distributed System Security Symposium (San Diego, California, USA, 2010).

Saxena, et al., "Document Structure Integrity: A Robust Basis for Cross-site Scripting Defense." In NDSS'09: Proceedings of the 16th Annual Network & Distributed System Security Symposium (San Diego, California, USA, 2009).

Su, et al., "The Essence of Command Injection Attacks in Web Applications." In POPL'06: Proceedings (if the 33rd symposium on Principles of programmin languages (Charleston, South Carolina, USA, 2006).

Ter Louw, et al., "BluePrint: Robust Prevention of Cross-site Scripting Attacks for Existing Browsers." In SP'09: Proceedings (if the 30th IEEE Symposium on Security and Privacy (Oakland, California, USA, 2009).

Van Gundy, et al., "Noncespaces: Using Randomization to Enforce Information Flow Tracking and Thwart Cross-site Scripting Attacks." In NDSS'09: Proceedings of the 16th Annual Network & Distributed System Security Symposium (San Diego, California, USA, 2009).

Vikram, et al., "Automatically Securing Distributed Web Applications Through Replicated Execution." In CCS'09: Proceedings of the 16th Conference on Computer and Communications Security (Chicago, Illinois, USA, 2009).

Wang, et al., "The Multi-Principal OS Construction of the Gazelle Web Browser." In SS '09: Proceedings of the 18th USENIX Security Symposium (Montreal, Canada, 2009).

* cited by examiner

```
<script type="text/javascript"> function validateform() {
  var copies, copies2;
  copies = document.getElementById ('copies');
  copies2 = document.getElementById ('copies2');
  if(copies.value < 0 || copies2.value < 0 ){
    alert("Error: Need positive copies");
    return false;
  }
  return false;
} function validatetext() {
  var dir;
  dir = document.getElementById ('directions');

var textRE = / ([a-zA-Z])*/;

var bReturn = textRE.match(dir);
  if(!bReturn)
     alert("Error: No special characters.");
  return bReturn;
}
</script>
```

FIG. 3

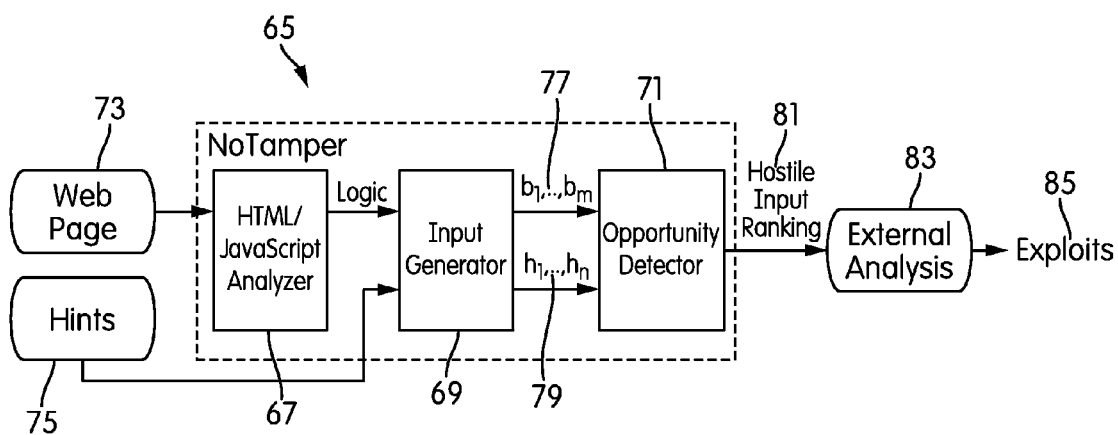

FIG. 4

```
1   function validateForm() {
2
3     var q - document.getElementById("quantity");
4     var n - document.getElementById("name");
5
6     if (q < 0 || n.length() > 10){
7         return false; // show error, don't submit
8     } else {
9         return true; // submit form
10       }
11  }
```

FIG. 7

```
1   $ca - $_POST['card'];
2   if($ca matches 'card-1' |'card-2')
3     //generate HTML to show a
4     //selected card in the form
5
6   $n - $_POST['name'];
7   if(strlen($n) > 10 );
8     $n - substr ($n, 10);
9
10  if($_GET('op')--"purchase") {
11
12     $cost - $_POST['quantity'] • $price + $shipping;
13
14     if(isset($_POST['discount']))
15        $cost - $cost - $_POST['discount'] • $cost / 100;
16
17     $q - "INSERT INTO orders ('name','address','card',
              'cost')";
18     $q .- "VALUES ('$n','$_POST[address]',$ca, $cost)
              ;";
19
20     mysql_query($q);
21     if(mysql_error())
22     $html .-"Please specify an address";
23  }
```

FIG. 8

Algorithm 1 WAPTEC (url)

1:   $fclient := clientAnalyzer(url)$
2:   $Q := \{true\}$
3:   loop
4:      $\alpha := pop(Q)$
5:      $v := solve(fclient \wedge \alpha)$
6:      $(success, fserver) := server(url, v)$
7:      if $success$ then
8:         $genHostiles(url, fclient, fserver)$
9:         for all $C_i \mid fserver = C_1 \wedge \cdots \wedge C_m$ do
10:           $v := solve(fclient \wedge \alpha \wedge \neg C_i)$
11:           $(success, fserver) := server(url, v)$
12:           if $success$ then $genHostiles(url, fclient, fserver)$
13:      else
14:         $Q := Q \sqcup \{\alpha \wedge \neg C_i \mid \neg fserver = \neg C_1 \wedge \cdots \wedge \neg C_m\}$
15:         $Q := simplify(Q)$
16:         if $empty(Q)$ then return

Algorithm 2 GENHOSTILIES(url, $fclient$, $fserver$)

1:   for all $\delta \in DNF(\neg fclient)$ do
2:      $v := solve(\delta \wedge fserver)$
3:      $success := server(url, v)$
4:      if $success$ then print Exploit found: $v$

FIG. 10

```
1   $main_ca - $_POST['card'];                          //
2   if ($main_ca matches 'card-1 | card-2') {           //
3
4   }
5
6   $main_n - $_POST['name'];
7   if(! strlen($main_n) > 10 ) {
8   }
9
10  if ($_GET['op'] -- "purchase"){
11
12     $main_cost - $_POST['quantity'] • 100 + 10; //
          where $price is 100
13
14     if(!isset($_POST['discount'])){
15     }
16
17     $main_q - "INSERT INTO order ('name', 'address',
          'card', 'cost')";
18     $main_q - "INSERT INTO order ('name', 'address',
          'card', 'cost')" . "VALUES('".$main_n,
          "','" . $_POST['address'] . "'" . $main_ca
          . "," . $main_cost . ");";
19
20     mysql_query ($main_q);
21     $_wb_status - 'SUCCESS";           // query
          execution denoted by SUCCESS status
22
23  }
```

FIG. 11

SYSTEM AND A METHOD FOR AUTOMATICALLY DETECTING SECURITY VULNERABILITIES IN CLIENT-SERVER APPLICATIONS

CROSS-REFERENCE TO RELATED APPLICATIONS

This application claims priority to U.S. Provisional Application No. 61/539,120, filed on Sep. 26, 2011, which is incorporated herein by reference in its entirety.

BACKGROUND

The present invention relates to web applications in client-server architecture models, and specifically to systems and methods for automatically detecting security vulnerabilities in web applications.

SUMMARY

Client-server applications (e.g., web applications, mobile applications, etc.) are accessed and used by millions people on everyday basis. Such applications depend heavily on client-side computation to examine and validate form inputs that are supplied by a user (e.g., "credit card expiration date must be valid"). This is typically done for two reasons: to reduce burden on the server and to avoid latencies in communicating with the server. However, when a server fails to replicate the validation performed on the client, it is potentially vulnerable to attack. Specifically, parameter tampering attacks are dangerous to a web application whose server fails to replicate the validation of user-supplied data that is performed by the client. Malicious users who circumvent the client can capitalize on the missing server validation.

The invention described in this application presents a novel approach for automatically identifying and detecting potential server-side security vulnerabilities in existing client-server applications through blackbox and whitebox analysis of the server's code. The specific tools (i.e., software programs) used to detect the security vulnerabilities in web applications are also described. Further, the described invention provides a tool and a method for preventing parameter tampering attacks on web applications. The proposed software tool that requires no access to, or knowledge of, the server side code-base, making it effective for both new and legacy applications.

In one embodiment, the invention provides a method for automatically detecting security vulnerabilities in a client-server application, where a client is connected to a server. The method is implemented by a computer having a processor and a software program stored on a non-transitory computer readable medium. The method includes automatically extracting, with the software program at the client, a description of one or more validation checks on inputs performed by the client. The method also includes analyzing the server, with the software program by using the one or more validation checks on inputs performed by the client, to determine whether the server is not performing validation checks that the server must be performing. The method further includes determining that security vulnerabilities in the client-server application exist when the server is not performing validation checks that the server must be performing.

Analyzing the server further includes determining whether the server accepts inputs that are rejected by the one or more validation checks performed by the client. This is completed by performing a probabilistic analysis of the responses generated by the server. The probabilistic analysis includes: generating, with the software program, a first set of inputs that the server should accept and a second set of inputs that the server should reject; sending the first and the second sets of inputs to the server; ranking, with the software program, responses received from the server for the first set of inputs and responses received from the server for the second sets of inputs; and determining that the server is vulnerable when the server responses for the second set of inputs are similar to the server response for the first set of inputs Further, determining whether the server accepts inputs that are rejected by the one or more validation checks performed by the client includes automatically analyzing the server code. Automatically analyzing the server code includes: generating, by using the description of the one or more validation checks performed by the client, one or more inputs that the server should accept; sending the one or more inputs that the server should accept to the server; analyzing, with the software program, whether the one or more inputs sent to the server perform a security sensitive operation on the server; extracting one or more validation checks performed by the server; comparing the one or more validation checks performed by the server with the one or more validation checks performed by the client; determining that a security vulnerability exits when the validation performed by the server is less stringent that the validation performed by the client; and generating, with the software program, one or more inputs that the server must reject.

In another embodiment, the invention provides a system for automatically detecting security vulnerabilities in a client-server application. The system includes a client connected to a server. The system further includes a computer having a processor and a software program stored on a non-transitory computer readable medium. The software program is operable to: automatically extract, at the client, a description of one or more validation checks on inputs performed by the client; analyze the server, by using the one or more validation checks on inputs performed by the client, to determine whether the server is not performing validation checks that the server must be performing; and determine that security vulnerabilities in the client-server application exists when the server is not performing validation checks that the server must be performing.

In yet another embodiment, the invention provides a method for preventing parameter tampering attacks on a running client-server application, where the client is connected to the server. The method is implemented by a computer having a processor and a software program stored on a non-transitory computer readable medium. The method includes automatically extracting, with the software program at the client, a description of one or more validation checks on inputs performed by the client, and enforcing the one or more validation checks on inputs performed by the client on each input that is submitted to the server.

The method further includes generating a patch by analyzing a client side code of each client generated by the application; and using the patch to prevent parameter tampering attempts when a client submits inputs to the server.

Other aspects of the invention will become apparent by consideration of the detailed description and accompanying drawings.

BRIEF DESCRIPTION OF THE DRAWINGS

FIG. 3 shows a client side code for the client shown in FIG. 2.

FIG. 4 schematically illustrates the operation of a NoTamper tool that involves blackbox analysis of security vulnerabilities of the web application of FIG. 1.

FIG. 7 shows a client side code of the client shown in FIG. 6.

FIG. 8 illustrate a server side code related to the client side code of FIG. 7.

FIG. 10 illustrates an example of the pseudo-code for the WAPTEC tool that involves whitebox analysis shown in FIG. 9.

FIG. 11 illustrates trace generated by extracting constraints from the server side code of FIG. 8.

DETAILED DESCRIPTION

Figure 1:
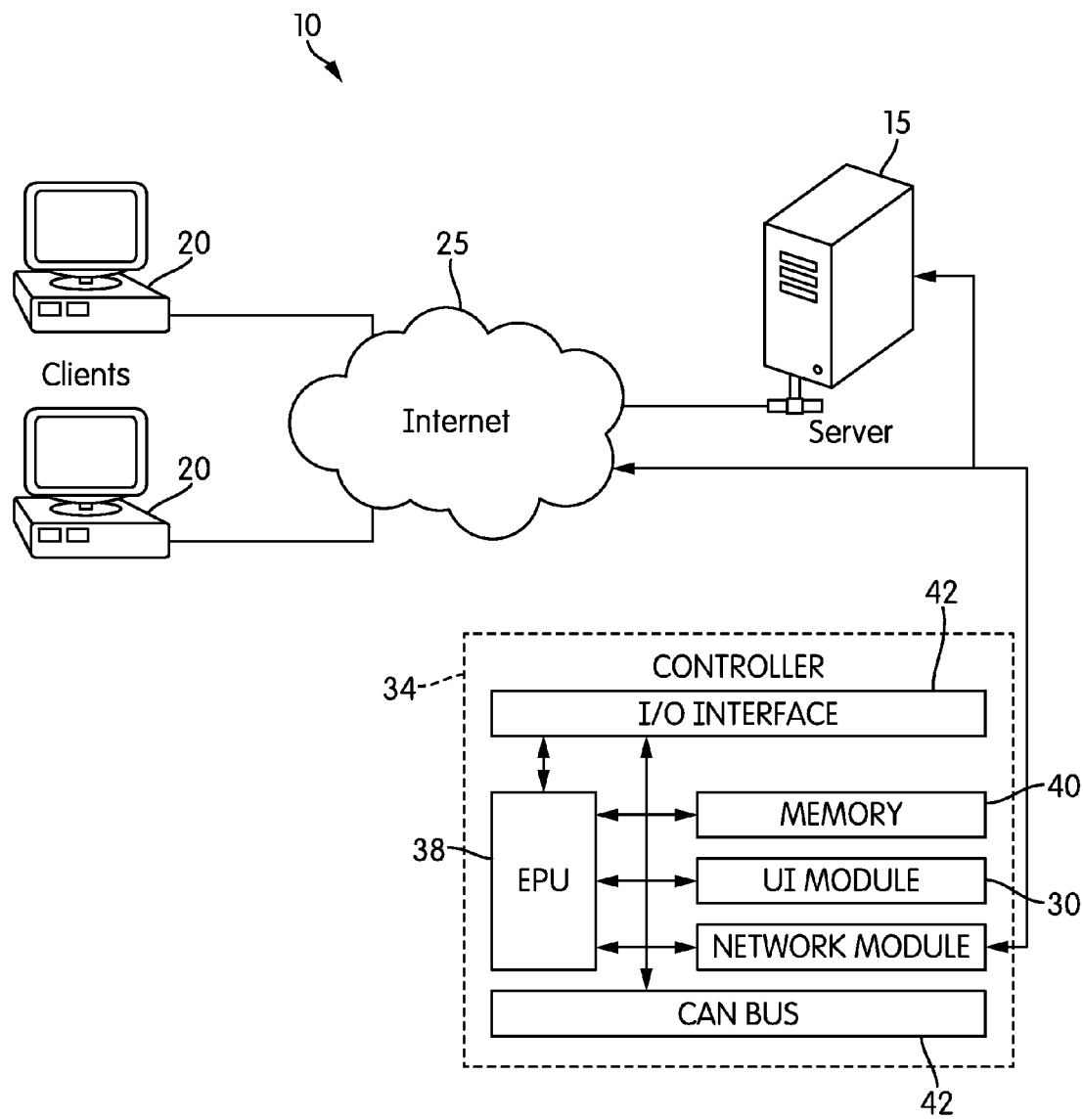
FIG. 1 illustrates a web application in a client-server architecture model and a controller for the web application.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Many of today's applications (e.g., web applications, mobile applications, etc.) represent a client-server architecture model. The client-server architecture model is a computing model that acts as a distributed application which partitions tasks or workloads between the providers of a resource or service, called servers, and service requesters, called clients. Often clients and servers communicate over a computer network on separate hardware, but both client and server may reside in the same system. A server machine is a host that is running one or more server programs which share their resources with clients. A client does not share any of its resources, but requests a server's content or service function. Ideally, a server provides a standardized transparent interface to clients so that clients need not be aware of the specifics of the system (i.e., the hardware and software) that is providing the service. Today clients are often situated at workstations or on personal computers, while servers are located elsewhere on the network, usually on more powerful machines.

Interactive form processing is pervasive in today's web applications. It is crucial for electronic commerce and banking sites, which rely heavily on web forms for billing and account management. Originally, typical form processing took place only on the server-side of a web application. Recently, however, with the facilities offered by the use of JavaScript on web pages, form processing is also being performed on the client-side of a web application. Processing user-supplied inputs to a web form using client-side JavaScript eliminates the latency of communicating with the server, and therefore results in a more interactive and responsive experience for the end user. Furthermore, client-side form processing reduces network traffic and server loads.

The form processing performed by the browser mostly involves checking user-provided inputs for errors. For instance, an electronic commerce application accepting credit card payments requires the credit card expiry date to be valid (e.g., be a date in future and be a valid month/day combination). Once the input data has been validated, it is sent to the server as part of a hypertext transfer protocol (HTTP) request, with inputs appearing as parameters to the request.

A server accepting such a request may be vulnerable to attack if it assumes that the supplied parameters are valid (e.g., the credit card has not yet expired). This assumption is indeed enforced by the browser-side JavaScript. However, malicious users comprise the security of the web application by employing parameter tampering attacks. Parameter tampering is a form of web-based attack in which certain parameters in the Uniform Resource Locator (URL) or web page form field data entered by a user are changed without that user's authorization. For example, malicious users can circumvent client-side validation by disabling JavaScript, changing the code itself, or simply crafting an HTTP request by hand with any parameter values of the user's choice.

Servers with parameter tampering vulnerabilities are open to a variety of attacks (such as enabling unauthorized access, SQL injection, Cross-site scripting).

The goal of this invention is to provide tools (e.g., software programs) and methods for detecting security vulnerabilities (e.g., parameter tampering) in existing web applications (or legacy applications) that are already in deployment. In one of the embodiments describe below (i.e., the blackbox approach), the method involves using human interaction (e.g., by testing professionals, web application developers, etc.) to determine if a web application (e.g., a website) is vulnerable to parameter tampering attacks and to produce a report of potential vulnerabilities and the associated HTTP parameters that triggered these vulnerabilities. Another of the embodiments described below (i.e., the whitebox approach), discloses a fully automated method (i.e., without any human interaction) for identifying potential security vulnerabilities in a web application.

The present invention relates to Internet-based client-server web applications, or any application in which a client communicates with a server via a remote connection, whether the connection is wired or wireless. FIG. 1 illustrates a system or a web application 10 that includes a server 15 communicating with a plurality of clients 20 via a network 25. The server 15 and the clients 20 include software code a browser-supported language (e.g., JavaScript) combined with a browser-rendered markup language (e.g., HTML). The code for the client 20 and for the server 15 can also be written in different programming language that are independent of one another. The network illustrated in FIG. 1 is the Internet. However, as described below, other types of networks can also be used. In one embodiment, the web application 10 is configured to be viewed through a browser application (not shown) residing on a client 20. The browser application is one means for accessing a website. When a client 20 wishes to access the server 15, the client 20 initiates a browser application (not shown) located on client 20.

FIG. 1 further illustrates a controller 34 associated with the web application 10. Generally, the controller is located on the server 15. However, in some embodiments, the web application 10 can be controlled by a controller positioned on a client 20. The controller 34 provides the overall control functions of the web application 10, including operating a software code for detecting a security vulnerability of the web application 10. The controller 34 is electrically and/or communicatively connected to a variety of modules or components of the server 15. For example, the illustrated controller 34 is connected to a user interface module 36, a network communications module 37, and other modules (not shown). It should be understood that the user interface module 36 could include software (stored in memory, e.g., in ROM and/or RAM) and hardware. The controller 34 includes combinations of hardware and software that are operable to, among other things, control the operation of the web application 10.

In some embodiments, the controller 34 includes a plurality of electrical and electronic components that provide power, operational control, and protection to the components and modules within the controller 34 and/or the web application 10. For example, the controller 34 includes, among other things, a processing unit 38 (e.g., a microprocessor, a microcontroller, or another suitable programmable device), a memory 40, input/output interface 42. The processing unit 38, the memory 40, the input/output interface 42, as well as the various modules connected to the controller 34 are connected by one or more control and/or data buses (e.g., common bus 43).

The memory 40 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 38 is connected to the memory 40 and executes software instructions that are capable of being stored in a RAM of the memory 40 (e.g., during execution), a ROM of the memory 40 (e.g., on a generally permanent basis), or another non-transitory computer readable medium such as another memory or a disc. Software included in the implementation of the web application 10 can be stored in the memory 40 of the controller 34. The software includes, for example, firmware, one or more applications, program data, filters, rules, one or more program modules, and other executable instructions. The controller 34 is configured to retrieve from memory and execute, among other things, instructions related to the control processes and methods described herein. In other constructions, the controller 34 includes additional, fewer, or different components.

The network communications module 37 is configured to connect to and communicate through a network 25. In some embodiments, the network 25 is, for example, a wide area network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3GSM network, a 4GSM network, a Digital Enhanced Cordless Telecommunications ["DECT"] network, a Digital AMPS ["IS-136/TDMA"] network, or an Integrated Digital Enhanced Network ["iDEN"] network, etc.). In alternative embodiments, the network 44 is, for example, a local area network ("LAN"), a neighborhood area network ("NAN"), a home area network ("HAN"), or personal area network ("PAN") employing any of a variety of communications protocols, such as Wi-Fi, Bluetooth, ZigBee, etc.

The connections between the server 15 and the clients 20 can be, for example, wired connections, wireless connections, or a combination of wireless and wired connections. In some embodiments, the controller 34 or network communications module 37 includes one or more communications ports (e.g., Ethernet, serial advanced technology attachment ["SATA"], universal serial bus ["USB"], integrated drive electronics ["IDE"], etc.) for transferring, receiving, or storing data associated with the device 10 or the operation of the device 10.

I. Blackbox Approach

The blackbox approach presents a tool (e.g., a software program called NoTamper) and a method for detecting security vulnerability in web applications that involves using human interaction. The method further produces a report of potential vulnerabilities and the associated HTTP parameters that triggered these vulnerabilities in the web application that can used in a variety of ways: professional testers can using the report to develop and demonstrate concrete exploits; web application developers can use it to check server code and develop patches as needed; and finally, web site administrators can use the report to estimate the likelihood that their site is vulnerable and alert the concerned developers.

A. Introduction and Summary

Figure 2:
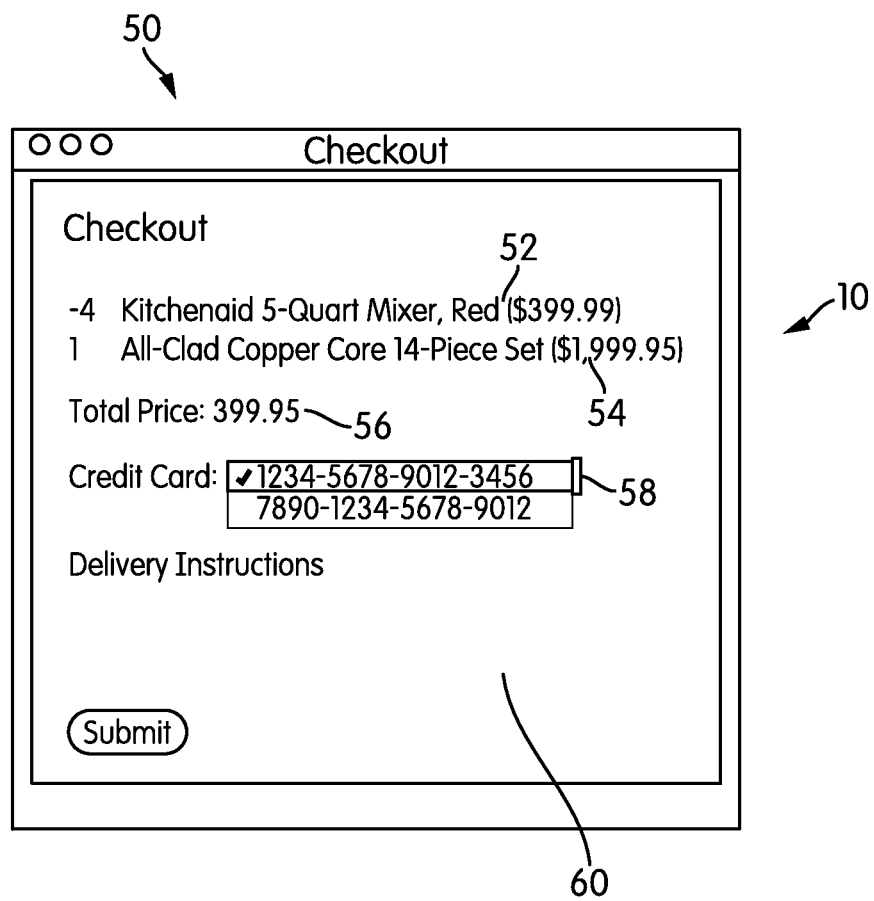
FIG. 2 illustrates an example of a client of the web application of FIG. 1.

FIG. 2 illustrates the client-side 20 of an example web application 10. The elements in this example web application 10 will be used throughout the application. This example presents the checkout form 50 of a shopping cart application. The checkout form 50 includes a first product filed 52, a second product filed, 54, a product filed 56, a credit card number filed 58, and a delivery instructions section 60. In the illustrated embodiment, a user has already selected two products for purchase in the products fields 52 and 54. The form 50 requires the user to enter the quantity of each product, the credit-card to be charged (e.g., displayed in a drop-down list of previously-used cards), and any special delivery instructions entered in section 60. Before this data from the checkout form 50 is submitted to the server 15, a client-side JavaScript code (shown in FIG. 3) performs a validation check of one or more parameters of the client specification. In particular, the code ensures that the quantity for each product is non-negative, and that the delivery instructions include no special characters. The onsubmit event handler performs this validation and submits the data to the server 15 if it finds the validation of the parameters valid, or asks the user to re-enter with an appropriate error message.

At that point, if the server 15 fails to replicate these validation checks performed by the client 20, the server 15 can enable a number of attacks to the web application. For example, the following attacks on the web application can occur.

Attack 1: Submitting negative quantities. By disabling JavaScript, a malicious user can bypass the validation check on the quantity of each product (parameters copies and copies2 in FIG. 3) and can submit a negative number for one or both products. It is possible that submitting a negative number for both products would result in the user's account being credited. However, that attack will likely be thwarted because of differences in credit card transactions on the server 15 involving debit and credit. However, if a negative quantity is submitted for one product in the first product filed 52 and a positive quantity is submitted for the other product in the second product filed 54 so that the resulting total is positive, the negative quantity acts as a rebate on the total price. In the illustrated example, the quantities chosen were −4 in filed 52 and 1 in filed 54 respectively, resulting in a "discount" of $1600 for the malicious user.

Attack 2: Charging another user's account. When the form 50 appears initially on the client-side, the credit card number filed 58 (e.g., a drop-down list) is populated with the user's credit card account numbers (parameter payment in FIG. 3). By submitting an account number not in this list, a malicious user can purchase products and charge someone else's account.

Attack 3: Pattern validation bypass. This attack enabled a malicious user to perform a Cross-site Scripting attack and escalate to administrator privileges. The web form 50 ensures that the delivery instructions (parameter directions in FIG. 3) contain only uppercase and lowercase letters. In particular, special characters and punctuation are disallowed to prevent command injection attacks on the server. By circumventing these checks, a malicious user can launch attacks such as cross-cite scripting (XSS) or structured query language (SQL) injection.

1. Problem Description

The user generally provides user input data to the web application 19 by entering user-supplied input (e.g., via a user interface like a keypad, etc.). Specifically, in a form submission, the client side 20 of a web application 10 solicits n string inputs from the user and sends them to the server 15 for processing. Formally, each string input is a finite sequence of characters from some alphabet $\Sigma$. The proposed invention denotes an n-tuple of such inputs as I and the set of all such I as $\mathcal{I}$.

$$\mathcal{I} = \Sigma^* \times \Sigma^* \times \ldots \times \Sigma^*$$

Generally, both the client 20 and the server 15 perform two tasks: 1) checking whether the user-supplied inputs satisfy certain constraints (also called inputs) related to validations checks; and 2) either communicating errors to the user or processing those user inputs. In particular, the web application 10 can send an error signal to a user when the user provided input data does not satisfy some of the parameters related to one or more validation checks. The proposed method focuses primarily on the constraint-checking task of the client and the server. The constraint-checking code is formulated as a function I→{true, false}, where false indicates an error. The system, uses Pclient to denote the constraint-checking function on the client and Pserver to denote the constraint-checking function on the server.

The proposed method is based on the observation that for many form processing web applications there is a specific relationship between Pserver and Pclient: that Pserver is more restrictive than Pclient. Because the server 15 often has access to more information than a client 20, Pserver sometimes rejects inputs accepted by Pclient. For example, when registering a new user for a website, the server 15 will guarantee that the user ID is unique, but the client 20 will not. In contrast, if Pserver accepts an input, then we expect Pserver to accept it as well; otherwise, the client would be hiding server-side functionality from legitimate users. Therefore, the following conditions are true for that for all inputs I:

$$p_{server}(I) = \text{true} \Rightarrow p_{client}(I) = \text{true}. \quad (1)$$

The server-side constraint checking is inadequate for those inputs I when the negation of this implication holds:

$$p\text{server}(I) = \text{true} \wedge p\text{client}(I) = \text{false}. \quad (2)$$

Therefore, each input satisfying (2) is identified as a potential parameter tampering attack vector. Generally, parameter tampering attack vectors sometimes arise because a developer simply fails to realize that the checks performed on the client 20 should be replicated on the server 15. However, even if the developer attempts to replicate the client checks on the server 15, the server 15 and client 20 are usually written in different languages, requiring the client 20 and the server 20 checks to be implemented and maintained independently of one another. Therefore, over a period of time, the validation checks in these two code bases could become out of sync, opening the door for parameter tampering attacks.

2. Approach Overview

One of the main goals of the proposed invention is to automatically construct inputs that exercise parameter tampering vulnerabilities using a black-box analysis of the server 15. The benefit of black-box server analysis is that this approach is agnostic about the server's implementation (e.g., PHP, JSP, ASP, etc.) and is therefore broadly applicable, even in antiquated and proprietary server technology. A drawback of black-box server analysis is that the system may not have sufficient information to eliminate false positives and false negatives. In particular, the system may not be able to reasonably generate all of the inputs the server 15 should be tested on, and even for those inputs that are generated, there is no reliable way to know if the server 15 accepts these inputs. Therefore, the goal of the proposed method is to identify opportunities for security vulnerabilities (e.g., parameter tampering) while requiring as little manual guidance as possible. In particular, human developers/testers are only required to provide hints about vital information not present on the client 20, and to check whether or not the parameter tampering opportunities identify by the disclosed method are true vulnerabilities (e.g., by generating actual exploits).

Next, the high level approach of the blackbox analysis is described. On the client 20, whose source code is in HTML and JavaScript, the system extracts a function fclient that is a logical representation of Pclient by using techniques from program analysis. In other words, the system automatically extracts description of one or more validation checks on inputs performed by the client. Subsequently, using logical tools, the system generates inputs h1, . . . , hn such that fclient (hi)=false for each i. Each of these inputs is identified as hostile because it is designed to illustrate a possible parameter tampering attack. In addition, the system also generates inputs b1, . . . , bm such that fclient (bi)=true for each i. Each such input is identified as benign because it is an input the server 15 will process normally. In the proposed method, the system can receive hints from the developers to confirm that these generated inputs were indeed processed normally.

The benign inputs help to assess which hostile inputs represent actual opportunities. The system submits each hostile and benign input to the server 15, producing responses H1, . . . , Hn and B1, . . . , Bm, respectively. The system them compares each hostile response Hi to the benign responses B1, . . . , Bm to produce a score that represents the likelihood that the server accepted hi. Intuitively, each of the benign responses represents a success message from the server 15. The more similar a hostile response is to the benign responses, the more likely the hostile input was successful and therefore a parameter tampering opportunity exists in the web application.

At the end of the process, the hostile inputs and responses are presented to the human tester ranked by similarity to benign responses. The tester is then free to verify hostile inputs as bona fide parameter tampering vulnerabilities and explore the severity of each vulnerability by sending modified hostile inputs to the server.

Condition (1) related to the server-client relationship, applies to many, but not all interactive form processing applications. For example, when the server 15 is a generic web service (e.g., Google maps), and the client is an application using a portion of that service (e.g., a map of Illinois) condition (1) may not apply. Nevertheless, the NoTamper software tool can be used in such settings by replacing the automatic extraction of fclient from HTML/JavaScript with a manually constructed fclient. The construction of benign/hostile inputs and their evaluation then proceeds as described above. In other words, NoTamper treats fclient, however it is generated, as an approximate specification for the intended behavior of the server 15 and then attempts to find inputs that fail to satisfy that specification. The NoTamper tool can therefore be viewed as a formal verification tool with a program analysis front-end for extracting a specification of intended behavior.

B. Architecture and Operation of the NoTamper Tool

FIG. 4 schematically illustrates the high-level architecture of the NoTamper tool 65. The NoTamper tool 65 is a software program that use probabilistic analysis of the responses generated by the server 15 to determine whether the server 15 accepts inputs that are rejected by the one or more validation checks performed by the client 20. The NoTamper tool 65 includes three main components: a HTML/JavaScript Analyzer 67, an Input Generator 69, and an Opportunity Detector 71. When a web page 73 opens in the web application 10, the HTML/JavaScript Analyzer 67 constructs logical formulas representing the constraint-checking function for each form on that web page. With reference to the example of FIGS. 2 and 3, the HTML/JavaScript Analyzer 67 constructs the following formula (fclient) that requires the parameters copies and copies2 be greater than or equal to zero; the parameter directions must not contain special characters; and the parameter payment must be one of the values in the number filed 58.

$$\bigwedge \begin{array}{l} \text{copies} \geq 0 \wedge \text{copies2} \geq 0 \\ \text{directions} \in [a-zA-Z]* \\ \text{payment} \in \\ (1234-5678-9012-3456|7890-1234-5678-9012) \end{array}$$

The Input Generator 69 uses the resulting formulas and any hints 75 provided by the user and constructs two sets of inputs for the server 15: inputs 77 that the server should accept (i.e., benign inputs b1, . . . , bm) and inputs 79 that the server should reject (hostile inputs (h1, . . . , hn). In the example related to FIG. 2, the Input Generator 69 constructs one benign input (variable assignment that satisfies the above formula):

{copies→0,copies2→0,directions→" ",payment→1234-5678-9012-3456}.

The Input Generator 69 also constructs a number of hostile inputs (variable assignments that falsify the formula above). Below are two such inputs that are the same as above except in (1) copies is less than 0 and in (2) directions contains special characters.

{copies→−1,copies2→0,directions→" ",payment→234-5678-9012-3456}  1.

{copies→0,copies2→0,directions→";*&☺",payment→1234-5678-9012-3456}  2.

The third component, the Opportunity Detector 71 receives the hostile 79 and benign inputs 79, generates server responses for each input, ranks the hostile inputs (at 81) by how likely it is that they are parameter tampering opportunities, and presents the results to an external tester 83 for further analysis. The external tester generates exploits 85 based on the performed analysis. Specifics regarding operation of the three components 67, 69, and 71 of the NoTamper tool 65 are described in more details below.

1. The HTML/JavaScript Analyzer

Web Page Initialization.

The JavaScript analysis of the NoTamper tool 65 specifically focuses on features/properties that relate to form validation and submission. In order to analyze the JavaScript code pertaining to form processing, the NoTamper tool simulates an environment similar to a NoTamper interpreter in a browser, including the Document Object Model (DOM). In such an environment, user interactions cause JavaScript code to be executed, resulting in changes to the JavaScript environment and the DOM.

To analyze the JavaScript code that actually performs validation, it is often important to understand the global JavaScript state as it exists when the browser first loads the form. To compute this global state, the NoTamper tool 65 executes the entire the initialization code for the web form concretely. It downloads external JavaScript, executes inlined JavaScript snippets, and keeps track of changes to global variables.

Identifying JavaScript Validation Code.

To construct fclient, the HTMLAJavaScript Analyzer must identify the code snippets relevant to parameter validation and understand how those snippets interact. This can be difficult because validation routines can be run in two different ways: (1) when a form is submitted and (2) in event handlers each time the user enters or changes data on the form.

A state machine naturally models the event-driven execution of JavaScript. Each state represents the data the user has entered and includes flags indicating which data contains an error. As the user supplies or edits data, JavaScript code validates the data and updates the error flags accordingly, resulting in a state transition. The constraints imposed by the client 20 on some particular data set could in theory be dependent on the path the user took through the state machine to enter that data, and hence the formula fclient could depend upon the structure of that state machine.

The NoTamper tool 65 addresses this challenge by analyzing the JavaScript event handlers as if they were all executed when the form was submitted. The benefit of doing so is computational: it obviates the need to manually simulate events or consider the order in which events occur. But it also reflects a reasonable assumption users often make about data entry—that the order in which data was entered does not affect the validity of that data. For those cases where the order of data entry matters, the analysis may be overly restrictive, e.g., considering all event handlers may simulate the occurrence of mutually exclusive events.

Analyzing JavaScript Validation Code.

Once the validation routines contributing to fclient are identified, they must be analyzed. Such code may span several functions each of which may consist of multiple control paths. Each such control path may enforce a unique set of constraints on inputs, requiring an all-path inter-procedural analysis. Further, JavaScript may enforce constraints that are not dependent on user inputs (e.g., disallow repeated submissions of a form through a global variable). The challenge is to extract only the constraints imposed on inputs by a given piece of JavaScript validation code.

The NoTamper tool 65 addresses this challenge by employing a mixed concrete-symbolic execution approach to analyze JavaScript and to identify the constraints enforced on user supplied data. Symbolic execution provides coverage of all control paths in the validation code and simulates validation of user supplied data. Concrete execution enables NoTamper tool 65 to ignore code snippets not dependent on symbolic inputs and to provide a suitably initialized environment for symbolic execution.

Resolving Document Object Model (DOM) References.

JavaScript validation routines typically use the DOM to access the form input controls. In the simulation of the JavaScript environment, associating DOM references in JavaScript to HTML input controls is non-trivial but necessary for constructing fclient. Further, the DOM may be dynamically modified by JavaScript by adding/deleting additional input controls or disabling/enabling existing input controls.

The NoTamper tool 65 addresses this challenge by constructing the pertinent portion of the DOM from the given HTML in such a way that it is available to the JavaScript concrete—symbolic evaluation engine during execution. Additionally, this DOM is maintained during the JavaScript evaluation by simulating DOM functions that are used to modify the DOM structure.

2. The Input Generator

The logical formulas provided to the Input Generator 69 are written in the language of string constraints. The Input Generator 69 encompasses two independent tasks: (i) constructing new logical formulas whose solutions correspond to hostile 79 and benign 77 inputs and (ii) solving those formulas to build concrete inputs. The following paragraphs focus on first task, and the second task is described further below.

Avoiding Spurious Rejections.

Two superficial but common forms of server-side parameter validation hide server vulnerabilities from a naive analysis: checking that all "required" variables have values and checking that all variables have values of the right type. Without accounting for such simple parameter validation, the NoTamper tool 65 would have discovered only a few parameter tampering opportunities.

To address this challenge, the Input Generator 69 constructs hostile and benign inputs where all required variables have values and all values are of the right type. The NoTamper tool 65 employs heuristics, which can be manually overridden, to compute the list of required variables and variable types.

Generating Orthogonal Hostile Input.

Each hostile input would ideally probe for a unique weakness on the server 15. Two hostile inputs rejected by the server 15 for the same reason (by the same code path on the server) are redundant. In the example of FIG. 2, the client requires one variable (copies) to be greater than or equal to zero and another variable (directions) to be assigned a value that contains no punctuation. To avoid redundancy, the NoTamper tool 65 generates one hostile input where copies violates the constraints (i.e., is less than zero) but directions satisfies the constraints (i.e., contains no punctuation), and another input where copies satisfies the constraints but directions does not.

To generate such orthogonal inputs, the Input Generator 69 converts fclient to disjunctive normal form (DNF) and constructs a hostile input for each disjunct. Generally, each disjunct represents inputs that violate fclient or a different reason than the other disjuncts.

Coping with Incomplete Information.

Sometimes the formula fclient fails to contain sufficient information to generate a true benign input 77 or a hostile input 79 that exposes a real vulnerability, yet a human tester is willing to provide that information. For example, many web forms only accept inputs that include a valid login ID and password, but the client-side code does not itself provide a list of valid IDs and passwords. In this case, fclient does not contain sufficient information for generating inputs that will be accepted by the server 20.

To address this issue, the Input Generator 69 accepts hints 75 that guide the search for hostile 79 and benign inputs 77. Those hints 75 take the form of logical constraints (in the same language as fclient) and are denoted 6. For example, to force the login variable \ user to the value "alice" and the password variable pass to the value "alicepwd", the user would supply the logical statement user= "alice"∧ pass="alicepwd".

Addressing state changes. Web applications 10 often store information at the server 15, and web form submissions change that state. This can cause the set of valid inputs to change over time. For example, a user registration web form will ask for a login ID that has not already been chosen. Submitting the form twice with the same login ID will result in a rejection on the second attempt. This is problematic because the NoTamper tool 65 submits many different inputs to check for different classes of potential vulnerabilities, yet the login ID is both required and must be unique across inputs.

To address this issue, the Input Generator 69 takes as an optional argument a list of variables required to have unique values and ensures that the values assigned to those variables are distinct across submissions. In the proposed method, generating inputs where certain variables all have unique values is sufficient to address server-side state changes, though in general more sophisticated graybox mechanisms will be necessary (e.g., the ability to roll-back the server-side databases between test cases).

Overall, the Input Generator 69 expects the following input parameters (1) the formula logical fclient (representing the set of inputs accepted by the client 20), (2) a list of required variables, (3) types for variables, (4) a manually supplied set of constraints (hints), and (5) a list of unique variables ((4) and (5) are optional). It generates hostile inputs 79 (a set of I such that fclient (I)=false) and benign inputs 77 (a set of I such that $f_{client}$(I)=true) such that all required variables have values, all values are of the right type, all manual constraints are satisfied, and each unique variable has a different value across all inputs. All input parameters to the Input Generator 69 are computed by the HTMLAJavaScript Analyzer 67 as described in the following paragraphs.

3. The Opportunity Detector

The Input Generator 69 produces a set of hostile inputs 79 (h1, . . . , hn) and set of benign inputs 77 (b1, . . . , bm). The goal of the opportunity detector is to determine which hostile inputs 79 are actually parameter tampering opportunities. The main challenge is that the NoTamper tool 65 must ascertain whether or not a given hostile input is accepted by the server 15 while treating the server 15 as a black box.

The NoTamper tool 65 addresses this challenge by ordering hostile inputs 79 by how structurally similar their server responses are to the server responses of benign inputs 77. The more similar a hostile response is to the benign responses, the more likely the hostile input is a parameter tampering opportunity. In the example of FIG. 2, a hostile input exists where the parameter copies is assigned a negative number. If the server 15 fails to verify that copies is a positive number, both the hostile and benign responses will present a confirmation screen, the only difference being the number of copies and total price. On the other hand, if the server 15 checks for a negative number of copies, the hostile response will be an error page, which likely differs significantly from the confirmation screen.

C. Algorithms and Implementation of the NoTamper Tool

All but one of the core algorithms employed by the NoTamper tool 65 manipulate a logical language for representing restrictions on user-data enforced by the client 20. In one embodiment, the language employed by \ NoTamper tool 65 is built on arithmetic and string constraints. It includes the usual boolean connectives: conjunction ($\wedge$), disjunction ($\vee$), and negation ($\neg$). The atomic constraints restrict variable lengths using $<, \leq, >, \geq, =, \neq$ and variable values using $\in, \notin$ in addition to the above operators. The semantics for the only non-obvious operators, $\in$ and $\notin$ express membership constraints on regular languages. For example, the following constraint requires x to be a non-negative integer: $x \in [0-9]+$. Table 1 illustrates a Backus-Naur Form (BNF) grammar defining the constraint language.

TABLE 1

Language of formulas generated by NOTAMPER

```
<sent> ::= <atom> | <conj> | <disj> | <neg>
<conj> ::= (<sent> ∧ <sent>)
<disj> ::= (<sent> ∨ <sent>)
<neg>  ::= (¬<sent>)
<atom> ::= (<term> <op> <term>)
<op>   ::= < | ≤ | > | ≥ | = | ≠ | ∈ | ∉
<term> ::= <var> | <num> | <str> | <len> | <reg>
<reg>  ::= perl regexp
<len>  ::= len (<var>)
<str>  ::= "<var>"
<var>  ::= ? [a-zA-z0-9]*
<num>  ::= [0-9]*
```

The algorithms described below are listed in the order they are executed by the NoTamper tool 65: (1) extracting client constraints from HTML and \JavaScript, (2) generating the additional inputs accepted by the Input Generator component, (3) constructing logical formulas whose solutions are hostile and benign inputs, (4) solving such logical formulas, and (5) identifying similarity between hostile and benign server responses.

1. Client Constraint Extraction

Extracting the constraints enforced by the client 20 on user-supplied data and representing them logically as fclient is done in two steps. First, an HTML analyzer extracts three items from a given web page: (1) constraints on individual form fields, enforced through HTML (2) a code snippet representing JavaScript executed on loading the web page as well as JavaScript executed for parameter validation performed by the client, and (3) a DOM representation of the form. Second, a concrete/symbolic JavaScript evaluator uses (3) during the symbolic evaluation of (2) to extract additional constraints that it then combines with (1). The result is the formula fclient.

Step 1: HTML Analyzer.

Table 2 summarizes the constraints imposed by each HTML input control through examples.

TABLE 2

Constraints imposed by HTML form controls.

| Control | Example | Constraints |
|---|---|---|
| SELECT | \<select name=x\>\<option value="1"\>\<option value="2" \>\<option value="3" \> | $x \in (1 \mid 2 \mid 3)$ |
| RADIO/ CHECKBOX | \<input type=radio name=x value="10"\>\<input type=radio name=x value="20"\> | $x \in (10 \mid 20)$ |
| HIDDEN | \<input name=x type=hidden value="20"\> | $x = 20$ |
| maxlength | \<input name=x maxlength=10 type=text/password\> | $len(x) \leq 10$ |
| readonly | \<input name=x readonly value="20"\> | $x = 20$ |

In the example of FIG. 2, the drop-down credit card number filed 58 includes a list for the payment control that includes two credit card values. The resulting constraint requires payment to be assigned one of the values in that list, as shown below:

payment$\in$(1234-5678-9012-3456|7890-1234-5678-9012).

The construction of a JavaScript snippet representing the parameter validation performed by the client 20 is accomplished by collecting all the event handlers (and associated scripts) and generating a single function that invokes all those event handlers, returning true exactly when all the event handlers return true. All the inlined JavaScript in the web page is then added as a preamble to the above script to initialize environment for the form validation JavaScript. The DOM representation for the form is constructed by recursively building the document object in the above JavaScript snippet i.e., the form being analyzed is initialized as a property of the document object which captures input controls as properties. Further, the document object simulates a small set of core methods that were necessary for processing forms (e.g., getElementById).

Step 2: JavaScript Symbolic Evaluator.

The key observation for extracting parameter validation constraints from a given JavaScript snippet is that form submission only occurs if that code returns true. In the simplest case, the code includes the statement return true or return <boolexp>, where <boolexp> is a boolean expression. It is possible that the code can return any value that JavaScript casts to true, but in generally the first two cases are far more common. Therefore, the key element in extracting constraints is to determine all the program conditions that lead to true return values from all event handler functions.

Specifically, to extract validation constraints, the symbolic analyzer begins by executing the validation code concretely. When a boolean expression with symbolic variables is encountered, the execution forks: one assuming the boolean expression is true and the other assuming it is false. Both executions replicate the existing variable values (program state) except for those affected by assuming the boolean expression is true or false. Concrete execution then resumes. Supported DOM modification APIs act on the DOM specific to a fork.

For a given program location, the program condition is the set of conditions that must be satisfied for control to reach that point. If a fork returns false, it is stopped and discarded. If a fork returns true, it is stopped and the program conditions to reach that point are noted. Further, the DOM representation at this point reflects the state of the HTML input controls while submitting the form including any modifications done by the JavaScript as well. The constraints checked on this fork are then computed by combining constraints of enabled controls in the DOM representation and program conditions using a conjunction ($\wedge$).

Once all forks have been stopped, fclient is computed by combining formulas for each path that returned true with disjunction ($\vee$). For the example of FIG. 2, one control path succeeds in returning true, resulting in the following formula.

$$\wedge \begin{array}{l} \neg \,(\text{copies} < 0 \vee \text{copies2} < 0)) \\ \text{directions} \in [a-zA-Z]* \end{array}$$

The above is then combined with constraint on variable payment mentioned before to generate fclient.

2. Hostile Input Guidance

The success of the operation of the NoTamper tool 65 depends crucially on generating interesting hostile inputs. The paragraphs below discuss the heuristics the HTML/JavaScript component uses to compute these values from a given web page.

Initial Values.

While generating fclient, the NoTamper tool 65 uses a heuristic to determine the intentions of default values for form fields. Some form fields are initialized with values that are simply illustrative of the kind of input expected, e.g., the value 1 for the number of product copies. Other form fields are initialized with a value that cannot be changed if submission is to be successful, e.g., a hidden field initialized to a session identifier. Currently, the NoTamper tool uses the default value for a hidden field as a constraint included in fclient and considers the default value for all other fields as illustrative of the expected value. In either case, the list of initial values is provided to the Input Generator 69 and used for other heuristics as described below.

Types.

The type for each variable controls the set of possible values occurring in both the hostile 79 and benign 77 inputs.

Choosing appropriate types can greatly improve the odds of success. In the example of FIG. 2, if the type of copies were the positive integers, the Input Generator 69 would never find the vulnerability that appears when copies is less than zero. Similarly, if the type of copies were all strings, the likelihood that the generator 69 randomly chooses a string that represents a negative integer is unlikely. Currently, the NoTamper tool 65 chooses a type for each variable based on (i) its occurrence in arithmetic constraints, (ii) the HTML widget associated with that variable, and (iii) its initial value. Occurrence in an arithmetic constraint implies a numeric type. An HTML widget that enumerates a set of possible values implies a value drawn from the set of all characters in the enumerated values. An initial value that is numeric also implies a numeric type. Integers are assumed unless there is evidence that real values are required.

Required Variables.

The list of required variables ensures that every hostile input includes a value for every variable in the list. Choosing too small a list risks hostile inputs being rejected because they did not pass the server's requirements for required values, and choosing too large a list can cause the server 15 to reject hostile inputs because unnecessary variables are given invalid values. The NoTamper tool 65 employs two techniques for estimating the required variables. One is analyzing the HTML for indications that a variable is required (e.g., asterisks next to field labels). The other is extracting the variables from fclient that are required to be non-empty, e.g., the variable cannot be the empty string or the variable must be assigned one of several values (from a drop-down list).

Unique Variables.

When a variable appears in the unique variable list, every pair of hostile inputs differs on that variable's value. This is useful, for example, when testing user registration pages, where submitting the same user ID twice will result in rejection because the ID already exists. Choosing too large a list, however, can result in fewer hostile inputs being generated and therefore fewer vulnerabilities being found. For example, if a field can only take on one of three values and is required to be unique across all hostile inputs, at most three inputs will be generated. The NoTamper tool 65 is conservative in the variables it guesses should be unique. If there is any indication that a variable can only take on a small number of values, it is not included in the unique list.

3. Input Generation

The Input Generator 69 constructs a series of formulas in the constraint language whose solutions correspond to hostile 79 and benign 77 inputs. The following paragraphs describe how the construction of formulas for benign 77 and hostile 79 inputs differ.

Benign Inputs 77.

To generate benign inputs satisfying fclient, the NoTamper tool 65 converts fclient to DNF, augments each disjunct with the user-provided constraints 6 and required-variable and type constraints, and finds one solution per disjunct. In relation to the example, of FIG. 2 if fclient is the following formula:

(copies>0 $\vee$ copies=0) $\wedge$ (directions$\in$[a-zA-Z]*).

The NoTamper tool 65 finds one solution for copies>0 $\wedge$ directions $\in$ [a-zA-Z] and another for copies=0$\wedge$ directions $\in$ [a-zA-Z]. If the type of copies is [0-9]+ and the type of directions is [a-zA-Z0-9]*, the NoTamper tool includes the constraints copies $\in$ [0-9]+ and directions $\in$ [a-zA-Z0-9]*. If the variable name is required and has type [a-zA-Z]*, the NoTamper tool includes the constraint name $\in$ [a-zA-Z]*. If σ is nonempty, the NoTamper tool includes it as well.

Satisfying the unique variable constraint is accomplished by keeping track of the values assigned to each variable for each generated input and adding constraints that ensure the next value generated for each unique variable is distinct from those previously generated.

Hostile Inputs.

To generate hostile inputs, the NoTamper tool 65 starts with ¬ fclient instead of fclient and then proceeds as for the benign case with one exception: filling in values for required variables. Consider any disjunct σ in the DNF of with ¬ fclient. If all the required variables occur within σ, the NoTamper tool simply finds a variable assignment satisfying σ and returns the result; otherwise, the NoTamper tool 65 augments that assignment with values for the required variables not appearing in σ. To do so, it finds values that satisfy fclient. The goal is that if the server 15 rejects the input it is because of the variables appearing in σ, not the remaining variables. Otherwise, it is unclear whether or not the server 15 performs sufficient validation to avoid the potential vulnerability σ

In the example above, the disjunctive normal form of ¬ fclient produces a formula with two disjuncts.

$$\vee \begin{array}{l} \neg \text{ (copies} > 0) \wedge \neg \text{ (copies } = 0) \\ \neg \text{ (directions} \in [a - zA - Z] *) \end{array}$$

If both copies and directions are required, the first disjunct does not include directions, and the second does not include copies. After solving the first disjunct with, for example, copies=−1, the NoTamper tool 65 assigns directions a value that satisfies the original formula (i.e., that satisfies directions is [a-zA-Z]*}$. Likewise, after solving the second disjunct producing a value for directions, the NoTamper tool assigns copies a value that satisfies the original formula (e.g., copies=1).

4. Constraint Solving

To solve formulas in the constraint language, the NoTamper tool 65 uses a custom-written constraint solver built based on a solver (HAMPI) that handles a conjunction of regular language constraints on a single variable of a fixed length. The NoTamper tool 65 handles disjunction by converting a given formula to DNF and solving each disjunct independently. For a given disjunct (which is a conjunction), the NoTamper tool 65 performs type inference to determine which variables are numeric and which are strings, extracts bounds on the size of all variables, and simplifies the disjunct to produce a conjunction of atoms from Table 3. The NoTamper tool 65 then applies Algorithm 1 to search for a variable assignment satisfying the resulting conjunction.

| | |
|---|---|
| len(<var>) = len(<var>) | <var>⊗ <var> |
| <var> ≠ <var> | <var>⊗ len(<var>) |
| <var> ≠ len(<var>) | len(<var>)⊗ len(<var>) |
| len(<var>) ≠ len(<var>) | <var> ⊕ <reg> |

TABLE 3

The reduced constraint language: ∧ and ∨ over the above atoms. ⊗ is the one of <, >, ≤, ≥, ⊗ is either ∈ or ∉.

Algorithm 1 SOLVE(vars, φ, asgn, BOUNDS)

| | |
|---|---|
| 1: | if vars = θ then return asgn |
| 2: | values := θ |
| 3: | var := CHOOSE(vars, = φ, asgn, BOUNDS) |

TABLE 3-continued

The reduced constraint language: ∧ and ∨ over the above atoms. ⊗ is the one of <, >, ≤, ≥, ⊗ is either ∈ or ∉.

Algorithm 1 SOLVE(vars, φ, asgn, BOUNDS)

| | |
|---|---|
| 4: | for all i in LOW(BOUNDS(var)) .. HIGH(BOUNDS(var)) do |
| 5: | if NUMERIC-VAR(var) then |
| 6: | if SAT(φ, asgn ∪ (var → i)) then |
| 7: | newasgn := SOLVE(vars−{var}, φ, asgn ∪ {var→ i}, BOUNDS) |
| 8: | if newasgn ≠ unsat then return newasgn |
| 9: | else |
| 10: | if not SAT(φ∧ len (var)=1, asgn) then goto next i |
| 11: | loop |
| 12: | val := HAMP1(φ\|$_{var}$ ∧ var ∉ values, i) |
| 13: | if val = unsat then goto next i |
| 14: | values := values ∪ {val} |
| 15: | if SAT(φ, asgn ∪ {var → val}) then |
| 16: | newasgn := SOLVE(vars−{var}, φ, asgn ∪ {var→val}, BOUNDS) |
| 17: | if newasgn ≠ unsat then return newasgn |
| 18: | return unsat |

Algorithm 1 takes as input a list of variables that require values, a logical formula, a partial variable assignment, and a function that maps each variable to that variable's bounds. It either returns unsat (denoting that no satisfiable assignment is possible) or an extension of the given variable assignment that satisfies the logical formula.

The first step of the algorithm is choosing a variable to assign. The NoTamper tool 65 chooses the variable with the smallest range of possible lengths. Then, the tool searches commences. String variables and numeric variables are treated differently. For numeric variables, the NoTamper tool 65 loops over possible values and for each one checks that assigning the variable the current loop value satisfies the constraints. If satisfaction holds, the variable is assigned the loop value.

For strings, the NoTamper tool 65 loops over possible lengths (as opposed to possible values), and for each one satisfying the length constraints invokes HAMPI to generate a variable assignment. HAMPI takes as input a logical formula with one variable and a length for that variable. It either returns unsat or a value satisfying the formula. Reducing the given formula φ with multiple-variables to a formula with just the chosen variable, denoted φ|var, is performed by selecting the subset of constraints where only the chosen variable occurs. If HAMPI finds a satisfying value, the algorithm checks that the value satisfies the relevant constraints HAMPI does not check: those constraining multiple variables. Additionally, the algorithm keeps a list of values HAMPI returns so that if the search fails at a later point in the search, and another value needs to be generated for the current variable, we can augment the logical formula given to HAMPI i to require a value not already chosen.

Once a variable has been assigned a value, Algorithm 1 recurses on the original variable list after having removed the chosen variable, the original logical formula, the original variable assignments augmented with the chosen variable's assignment, and the original variable bounds. When the variable list becomes empty, the algorithm returns the given variable assignment, indicating that all constraints are satisfied by that assignment. If no such assignment can be found, the algorithm returns unsat.

5. HTML Response Comparison

In order to determine whether hostile inputs were accepted by the server 15, the proposed method compares the server's response against a response that is known to have been generated by benign (valid) inputs 77. Since the server's responses are in HTML, the system employs HTML similarity detection. There are many available similarity detection algorithms for HTML responses, the most notable being algorithms for computing tree edit distance. In the disclosed method, since the HTML documents are produced by a single web application, it is very likely that these responses are structurally more aligned than documents from different sources, and therefore the system uses a document comparison strategy based on the known algorithm on approximate string matching.

Approximate Matching.

An important issue to be addressed in response comparison is that the contents of a HTML response will frequently include a number of variable elements that are not dependent on the server inputs (e.g., time stamps, user names, number of people logged in, etc.). A large number of such elements introduce differences in benign responses, even when the inputs are identical. Therefore, the proposed method uses an approximate matching strategy that filters out such noise from benign responses before comparing to hostile responses.

For example, if there are only two benign responses B1 and B2, analyzing these responses and extracting their differences will often isolate the noisy elements in the page. These noisy elements can then be removed. For this purpose, the method proposes a utility that analyzes these two responses and returns the following: (1) the common sequences in B1 and B1 (2) content in B1 that is not in B2 and (3) content in B2 that is not in B1. Elements (2) and (3) comprise the noise, and once eliminated from B1 and B1 respectively, the result is the same HTML document C1.

To analyze hostile response hi, the method repeats the noise elimination procedure, only this time with files B1 and Hi. The resulting HTML, C2, produces two possibilities, depending on whether the input hi was accepted or not. If the input was accepted, the server response Hi is likely to be similar (modulo noise) to B1, and therefore the result C2 is likely to be structurally the same as C1. In case the input was rejected, the server returns a response that is likely to be structurally dissimilar, and therefore C2 will be less similar to C1.

The final step is the comparison between C1 and C2. Again, a naive comparison will not work because of the possibility that not all noise causing elements were removed during the earlier step. For example, page generation times are often embedded in the page itself, if the times were the same for B1 and B2, but different for H1, then C1 and C2 will not be strictly structurally the same. Instead, the method uses the approximate matching strategy on C1 and C2 as inputs. This time, however, the method computes the edit distance between the two structures, resulting in a numeric value (called difference rank) for each hostile input. The higher the rank for a given hostile input, the less likely it is that the input points to a potential vulnerability.

6. Implementation

In one embodiment, the HTML analysis is implemented on top of the APIs provided by the HTML Parser2, specifically using visitors for <form> and <script> tags. The JavaScript analysis is performed using a modified Narcissus JavaScript engine-based symbolic evaluator. Narcissus is a meta-circular JavaScript interpreter that uses SpiderMonkey JavaScript engine's interfaces. The Input Generator is built as a wrapper around the solver HAMPI using the subroutine library Epilog for manipulating logical expressions written in KIF. It consisted of 1700 lines of Lisp code. The Opportunity Detector 71 is primarily implemented in Java. Based on inputs generated by the constraint solver, a Java-based module relayed HTTP requests to the test server, saved the responses for processing, and implemented algorithm to compute the difference rank. It is to be understood that the described programs and tools represent only an exemplary implementation of the blackbox analysis and the NoTamper tool 65. In other embodiment, other programs, tools, and algorithms can be used.

D. Examples of the Application of the NoTamper Tool

Experiments with the NoTamper tool 65 were performed on 8 open source applications and 5 live websites. The chosen open source applications were heavily reliant on web forms (e.g., blogs, business and management applications) and do not use AJAX. The chosen live websites, included forms that likely contain flaws (e.g., an account at the exploited bank). Table 5 provides some background details for these applications. For open source applications, columns 2 and 3 show the lines of code and number of files, respectively. Column 4 shows the type of constraints enforced by the evaluated forms and the last column shows the functionality provided by the application. The applications were deployed on a Linux Apache web server (2.8 GHz Dual Intel Xeon, 6.0 GB RAM) and NoTamoer tool 65 ran under Ubuntu 9.10 on a standard desktop (2.45 Ghz Quad Intel, 2.0 GB RAM).

TABLE 5

NoTAMPER analyzed 8 open source applications and 5 live websites

| Application | Lines of Code | Files | Client-Side | Use |
|---|---|---|---|---|
| A | 186,691 | 1,103 | HTML + JS | Busn Mgt |
| B | 9,431 | 59 | HTML + JR | Blog |
| C | 91,712 | 273 | HTML + JS | Inventory |
| D | 97,304 | 166 | HTML + JS | Forum |
| E | 114,959 | 335 | HTML + JS | Support |
| F | 58,198 | 195 | HTML | Inventory |
| G | 228,058 | 1,745 | HTML + JS | Content Mft |
| H | 167,087 | 531 | HTML | Blog |
| I | | | HTML | Conference |
| J | | | HTML + JS | Library |
| K | | | HTML | Gaming |
| L | | | HTML | Banking |
| M | | | HTML + JS | Shopping |

The findings of the experiments are summarized in Table 4. For each application (column 1), the table includes the number of forms analyzed (column 2), the number of hostile inputs the NoTamper tool 65 generated (column 3), the number of tampering opportunities (column 4), and whether or not a vulnerability for that application was confirmed (column 5). The last column (column 6) lists the number of confirmed false positives.

TABLE 4

Summary of NoTAMPER results (Opportunities: 169, Examined: 50, Confirmed exploits: 9, False Positives: 43)

| Application | Forms | Hostile Inputs | Pote. Oppo. | Conf. Exploit? | Conf. FP |
|---|---|---|---|---|---|
| D | 5 | 56 | 42 | ✓ | 8 |
| A | 3 | 37 | 35 | ✓ | 16 |
| C | 1 | 10 | 8 | ✓ | 1 |
| B | 1 | 8 | 8 | ✓ | 7 |
| H | 1 | 25 | 21 | | 2 |
| G | 1 | 6 | 5 | ✓ | 4 |
| E | 3 | 28 | 27 | ✓ | 0 |
| F | 2 | 13 | 9 | ✓ | 0 |
| I | 1 | 23 | 4 | | 2 |
| J | 1 | 15 | 4 | | 2 |
| K | 1 | 4 | 4 | | 1 |

TABLE 4-continued

Summary of NoTAMPER results (Opportunities: 169, Examined: 50, Confirmed exploits: 9, False Positives: 43)

| Application | Forms | Hostile Inputs | Pote. Oppo. | Conf. Exploit? | Conf. FP |
|---|---|---|---|---|---|
| L | 1 | 5 | 1 | ✓ | 0 |
| M | 1 | 6 | 1 | ✓ | 0 |

When deployed by a web developer to analyze a web application, column 4 is of primary interest. A developer need only look through those hostile inputs that were accepted by the server 15, and for each one manually decide whether or not the server is actually vulnerable. When deployed by testers, they may confirm exploits by further experimenting with the accepted hostile inputs. The experiments confirmed at least one exploit in each application. Further, working exploits in 9 out of 13 applications were developed. Some of the exploits that were discovered are discussed in more detail below.

Unauthorized Money Transfers.

An online banking website allows customers to transfer money between their accounts online A customer logs onto the web site, specifies the amount of money to transfer, uses a drop-down menu to choose the source account for the transfer, and uses another drop-down menu to choose the destination account. Both drop-down menus include all of the user's account numbers. An experiment shows that the server for this application does not validate that the account numbers provided were drawn from the drop-down menus. Thus, sending the server a request to transfer money between two arbitrary accounts succeeded, even if the user logged into the system was an owner of neither account.

When the NoTamper tool 65 analyzed this form, it generated a hostile input where one of the account numbers was a single zero. The server response was virtually the same as the response to the benign inputs (where the account numbers were drawn from the drop-down menus). Therefore, this input was ranked highly by the NoTamper tool 65 as potential security vulnerability. When attempting to confirm the vulnerability, a user was able to transfer $1 between two accounts of unrelated individuals. (Note that if the server had checked for valid account numbers but failed to ensure the user owned the chosen accounts, the NoTamper tool 65 would not have discovered the problem; however, if the human tester provided valid account numbers as hints, the NoTamper tool 65 would have identified the problem.) Such security vulnerability could have significant impact given that the bank has large number of customers.

Unlimited Shopping Rebates.

An online shopping website sells computer equipment (e.g., hard drives, printers, network switches). The tested form shows the contents of the shopping cart and allows a user to modify the quantities of the selected products. The quantity fields employ JavaScript to restrict shoppers to enter only positive numeric values. When the NoTamper tool 65 analyzed this form, it supplied a negative number for one of the quantity fields (and submitted through a proxy). The resulting HTML page, while containing a different total and quantity than the benign input, was otherwise identical, and thus the NoTamper tool 65 ranked it as a parameter tampering opportunity.

The above situation described above was further developed into another serious exploit. A user was able to add an item with negative quantities by disabling JavaScript in the browser. When JavaScript was re-enabled, the application computed the total purchase price by multiplying the quantity of each product by its price. Thus, the negative quantities enabled unlimited rebates for any purchase. Furthermore, these negative quantities were successfully accepted by the server, thus permitting the user to purchase at the reduced price.

Privilege Escalation.

A tested application stores user profiles and employs a web form to allow users to edit their profiles. After logging in, the application provides the user with a web form for editing her profile. Included in that form is the hidden field userid, where the application stores the user's unique identifier. When the form is submitted, the server updates the profile for the user identifier corresponding to userid. By changing userid to that of another user, it is possible to update any user's profile.

When the NoTamper tool 65 analyzed this form, it generated a hostile input where the value for userid was the number 2 (as opposed to the initial value 1). The server's response was virtually identical to the benign input response (where the value was set to 1), and was therefore reported as a tampering opportunity.

After confirming this vulnerability, us user enhanced the exploit so as to modify the profile of an administrator user to include a Cross-site Scripting (XSS) payload. Every time the administrator user logged in, the script executed and sent the administrator cookie to a server under our control. With the help of the stolen cookie an outside user then re-constructed and hi-jacked the administrator's session, thus gaining all the privileges of the administrator. This experiment demonstrates that parameter tampering vulnerabilities could be used as a launch pad for other privilege escalation attacks.

Table 6 provides more details of our experiments. Column 2 shows the average formula complexity for the client-side constraints (i.e., the average number of boolean connectives and atomic constraints. Column 3 shows the total number of tampering opportunities. Column 4 shows the number of potential vulnerabilities derived from HTML input controls other than hidden fields. Column 5 shows the number of potential vulnerabilities due to JavaScript; and Column 6 shows the number derived from hidden fields.

TABLE 6

Details of NOTAMPER results

| Application | Forms | Hostile Inputs | Pote. Oppo. | Conf. Exploit? | Conf. FP |
|---|---|---|---|---|---|
| D | 5 | 56 | 42 | ✓ | 8 |
| A | 3 | 37 | 35 | ✓ | 16 |
| C | 1 | 10 | 8 | ✓ | 1 |
| B | 1 | 8 | 8 | ✓ | 7 |
| H | 1 | 25 | 21 |  | 2 |
| G | 1 | 6 | 5 | ✓ | 4 |
| E | 3 | 28 | 27 | ✓ | 0 |
| F | 2 | 13 | 9 | ✓ | 0 |
| I | 1 | 23 | 4 |  | 2 |
| J | 1 | 15 | 4 |  | 2 |
| K | 1 | 4 | 4 |  | 1 |
| L | 1 | 5 | 1 | ✓ | 0 |
| M | 1 | 6 | 1 | ✓ | 0 |

Hostile Input Ranking.

For each form input the NoTamper tool 65 issued an HTTP request to the appropriate application and computed the difference rank (edit distance in bytes) of the response as described previously. A sorted list of the difference rank is produced for each application. In one embodiment, it is easy to identify the threshold limits for a potential parameter tampering opportunity, as the difference rank between inputs potentially accepted by the server tend to be at least an order of magnitude smaller than the ones potentially rejected by the server.

Figure 5:
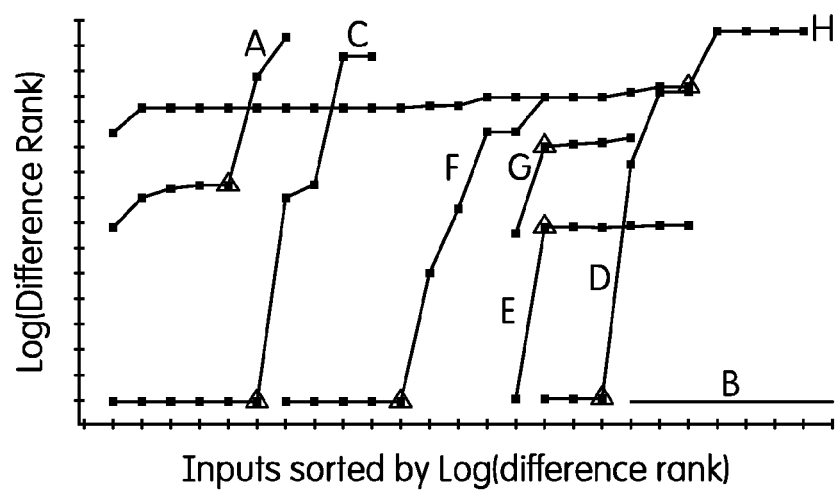
FIG. 5 illustrates a graph showing thresholds for ranking a potential parameter tampering opportunities detected by the NoTamper tool of FIG. 4.

The graph shown in the FIG. 5 illustrates the thresholds for ranking a potential parameter tampering opportunity. FIG. 4 shows only one form from each application represented in the graph, although several forms were tested in every application. Since the purpose of the graph is only to show a threshold, the graph plots the logarithm of the difference rank in the Y-axis, with the X-axis representing the various input points sorted according to their difference ranks. The thresholds for various forms are identified by using a bold triangle, and those inputs are classified below the threshold as parameter tampering opportunities. The graph clearly shows that such thresholds exist as denoted by steep rises in the difference ranks.

Manual Intervention.

For each experimented web form, a user manually provided certain kinds of hints to the NoTamper tool 65, the hints pertaining to information not present on the client but that a human tester might provide. For example, in an application where the server required a valid login name to access the form, the user provided such a name to NoTamper tool 65. Throughout all the experimented forms, the user added one of three hints: credentials or session cookies, inputs required by the server (i.e., required variables list), and variables required to be unique across invocations (i.e., unique variables list). To discover such restrictions, the NoTamper tool 65 generated an input satisfying the client-side constraints (fclient). If this input was rejected, the use examined the reasons and provided hints that the NoTamper tool 65 could generate a benign input accepted by the server.

The described experiments exposed several serious exploits in existing open source web applications and web sites. The results highlight a significant gap between the server-side parameter validation that should occur and the server-side validation that does occur in today's web applications. Therefore, using the novel approach (i.e., the NoTamper tool 65) for detecting serve-side security vulnerabilities in web application can be very helpful for different users.

II. Whitebox Approach

The whitebox approach presents an alternative tool (e.g., a software program called WAPATEC—Whitebox Analysis for Parameter Tampering Exploit Construction) and a method for automatically detecting security vulnerability in web applications that involves no human interaction. The tool is further configured to generate exploits by construction to demonstrate the detected security vulnerabilities. The disclosed WAPATEC tool involves a new approach to whitebox analysis of the server's code.

A. Introduction and Summary

As described above with respect to the Blackbox approach, interactive processing and validation of user input is increasingly becoming the de-facto standard for applications programmed for the Web. Consider the example of a shopping cart application shown in FIG. 2, where inputs such as the items in the shopping cart, submitted by a user are supplied as parameters to the server side. The server 15 often makes certain assumptions about those parameters (e.g., the credit card expiration date is valid and is not a past date). Most of those assumptions are being enforced by JavaScript on the client side, thereby avoiding extra round trips to the server caused by incorrect data entry. However, malicious clients often circumvent the client-side validation (e.g., craft HTTP requests by hand), and supply invalid data to the server 15. The correct way to program these applications is to ensure that the server 15 performs the same (or stricter) validation checks that are performed at the client 20. If this is not the case with a server 15, then it is vulnerable to security vulnerabilities (e.g., parameter tampering attacks).

The previously describe approach for identifying such vulnerabilities in web applications used the blackbox approach that involved generating opportunities for potential tampering vulnerabilities. This blackbox approach, while being most suitable for testing web sites whose server side code is not available, involves human labor in converting opportunities to actual exploits.

The whitebox approach described bellow is a fully automated approach to identify the presence of such security vulnerabilities in a web application. Therefore, this approach eliminates the need for a human interaction in the process. Since there is no human interaction in the process, the proposed whitebox approach identifies such vulnerabilities without false alarms. Therefore, this approach must include mechanisms that confirm the existence of each potential vulnerability that is identified.

The basic problem of detecting parameter tampering vulnerabilities is to identify validation checks that are "missing" in a server 15. This can be done if a formal specification of the set of checks that must be performed by the server exists. Developing such specifications is often done through a manual process, and is a difficult task for legacy applications.

The key idea in the whitebox approach stems from the observation that in a web application, a client code already constitutes a description of the server's intentions regarding parameter validation checks. The proposed WAPATEC tool can, therefore, extract a specification directly from the client code. This specification can then be used to check the server side code for vulnerabilities.

Based on the above observation, the whitebox approach disclosed herein proposes a new formulation of the problem of automatically detecting parameter tampering vulnerabilities. According to the new whitebox approach, a web application is said to be vulnerable when the server-side parameter validation is weaker than client-side validation. In other words, the server 15 performs fewer checks than the client 20 as to the well-formedness of the client supplied input. Such weaknesses point to security vulnerabilities on the server 15 that can be exploited by malicious users. When the WAPTEC tool determines such a weakness, the proposed method automatically generates a concrete instance of the vulnerability in the form of an exploit.

Therefore, the WAPTEC tool performs web application vulnerability analysis by combining techniques from formal logic and constraint solving, symbolic evaluation and dynamic program analysis. In one embodiment, the proposed whitebox approach implementation is targeted towards applications written using the LAMP (Linux, Apache, MYSQL, PHP) stack, one of the most widely used development and deployment platforms for web applications.

Due to the inherent multi-tiered nature of a LAMP application, the analysis that is performed has to reason about the client side code that validates user supplied inputs, the server side transaction processing logic and (often) the database used for persistent storage. These tiers are implemented as different modules in different languages (HTML/JavaScript, PHP and SQL), and the core analysis of the proposed approach needs to abstract the validation logic in each of these tiers and reason about them. While the Links programming language and several other frameworks facilitate principled construction of multiple tiered applications, they are not applicable to reason across the three tiers of existing (legacy) LAMP applications.

Therefore, the proposed whitebox approach involves an analysis that presents a uniform framework to reason about the three different tiers of an interactive LAMP application. Since this analysis spans the client, server and database, it is comprehensive and precise about its understanding of the validation performed on web application inputs, and identifies vulnerabilities "by construction".

B. Running Example

The main idea behind the new whitebox approach is that it is possible to use the client 20 of a web application as a specification of the server's intended behavior. The basis for this idea stems from the following observations: 1) validation checks that are implemented at a client convey the "intention" of the server side of a web application; 2) the server code on occasion does not replicate these intended checks often leading to security flaws.

The reason for the omission of security checks is multifold. First, not all web developers are aware of the security concerns about data received from a client cannot be trusted to respect these intended checks and therefore need to be replicated. Second, the client 20 and the server 15 often originate from two different codebases. For example, a client 20 is written in JavaScript and the server 20 in one of the many platforms such as PHP, ASP, Java, etc. When there are two codebases, improvements made to one (such as additional new validation checks and maintenance updates) do not always translate to changes to the other, leading to security violation. The proposed new method detected such mismatches through automated code analysis.

Figure 6:
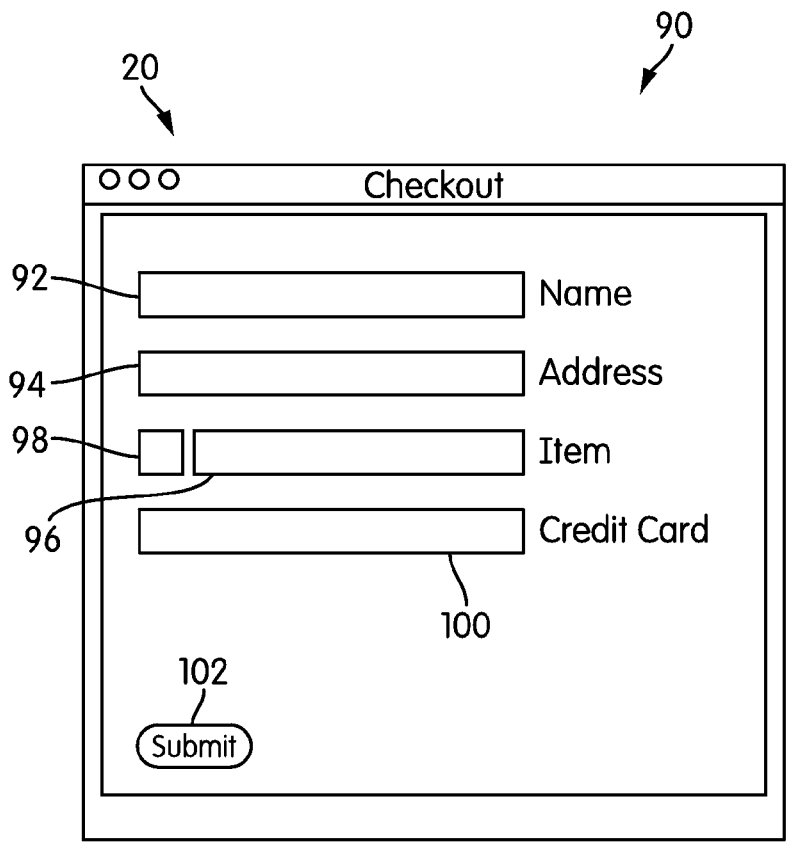
FIG. 6. illustrates another example of a client of the web application of FIG. 1.

FIG. 6 illustrates another example of a client 20 of a web application 10. Specifically, this is a web application 10 that provides a shopping checkout form 90. The checkout form 90 includes a name filed 92, an address filed 94, an item filed 96, an item quantity field 98, a dropdown menu 100 for displaying previously used credit cards to pick the card for the current purchase, a submit button 102, and a hidden field op (not shown) that is set to "purchase".

FIGS. 7 and 8 respectively illustrate a client side code and a server side code of the web application shown in FIG. 6. The client side code of FIG. 7 performs its validation checks at lines 6 through 7. The code checks if the quantity field is a positive integer, and if the supplied name is less than 10 characters, and submits input to the server 15 if these conditions are met.

The server side code shown in FIG. 8 computes the cost of purchase and inserts this into the orders database. To illustrate the basic parameter tampering attack, notice that the validation check for quantity is not replicated in the server 15. It is therefore possible that a malicious client can perform this attack by submitting a negative quantity field, reducing the cost computed to a low value. In order to uncover this attack, the client code (e.g., JavaScript) in FIG. 7 must be analyzed, leading to the inference that the constraint on the quantity field restricts it to a non-negative number. Similarly, the server PHP code in FIG. 8 must be analyzed to infer that it does not impose any constraints on this field. In addition, the following challenges need to be addressed as well.

Restrictive Servers.

While servers 15 occasionally fail to replicate client checks, they are often designed to be more restrictive than clients in processing user input. Such restrictions may be implicit or explicit. In the example of FIG. 7, the client restricts the length of the name field to 10 characters or less. On an input that does not meet this constraint (i.e., has 11 or more characters), the server 15 chooses to "sanitize" this field by considering only the first 10 characters of the submitted value. A naive approach that doesn't satisfy the client restrictions and fails to consider the effect of sanitization in reaching a sensitive operation on the server will generate a false alarm. The proposed whitebox analysis is designed to factor such changes to input and avoids generating false alarms.

Handling Database Operations.

Any server side analysis should not only consider the effect of server side code, but also the effect of its database operations. For instance, database operations may further constrain data submitted by a client 20 through integrity constraints. Failing to consider these constraints will also generate false alarms. For example, the address field in database has an integrity constraint that ensures that it is not null. Failing to consider such constraints will generate false alarms. The proposed whitebox approach is designed to correctly handle the effect of such database constraints.

Negative Parameter Tampering.

Sometimes a server side file is written to handle multiple forms. In the above example, the server-side code additionally checks for parameter discount. While this code was intended for processing a totally different form that contains discounts for the user, it is not uncommon for LAMP applications to reuse the code that has some shared processing of content. An exploit that introduces this field discount can result in providing unlimited discounts to the total price. This is called negative tampering, as it is performed by an input field that is not present in the original form. By whitebox analysis of the server side code, the proposed method identifies such vulnerabilities.

C. Whitebox/WAPTEC Approach Overview

WAPTEC's basic approach to identifying security vulnerability (e.g., parameter tampering exploits that may be inputs the client 20 rejects but the server 15 accepts) on a web application is a two-step process that automatically analyzes the server code. Step 1—find server control paths that if taken result in the input being accepted, i.e., paths that lead to sensitive operations (such as the INSERT query in line 17 of FIG. 8). Step 2—find inputs leading to each such control path that the client rejects (such as submitting a negative quantity to the server). In WAPTEC, step 1 is accomplished using a form of constraint-guided search that probes the server 15 with inputs that the server 15 ought to accept and then analyzes the code the server executed to determine if that control path led to a sensitive sink. Any input the server accepts that results in execution of a sensitive operation is called a benign input. Step 2 is also accomplished by probing the server 15 with inputs and checking for a sensitive sink on the resulting control path, though this time the inputs are those the server 15 ought to reject. Any input the server 15 ought to reject that results in execution of a sensitive operation is a hostile input. Hostile inputs are correct by construction parameter tampering exploits.

Unlike many bug-finding program analysis efforts, WAPTEC leverages the existence of client-side code (a web form) for both steps. When searching for a benign input in step 1, WAPTEC only generates inputs that the web form accepts and would submit to the server. Moreover, because the client code is relatively simple to analyze, WAPTEC extracts a logical representation of all such inputs fclient and utilizes constraint-solving technology to directly construct an input the client accepts (i.e., without fuzzing). While the server 15 does not accept every input the client 20 accepts, therefore requiring constraint-guided search, the client side code is a good enough approximation that WAPTEC often finds a benign input on the first try.

When searching for attacks on a given control path on the server in step 2, WAPTEC again uses fclient to generate inputs, but in this case the inputs are designed to be hostile.

The main idea of WAPTEC's approach is that if the client code rejects an input, the server ought to reject it as well. Thus, every input satisfying the negation of fclient is a potential hostile input (parameter tampering exploit), which constraint solvers can again construct directly. Furthermore, WAPTEC uses the logical representation of fclient to group all the potential exploits by the vulnerabilities they illustrate and generates one (or any number) of exploits per distinct vulnerability.

Figure 9:
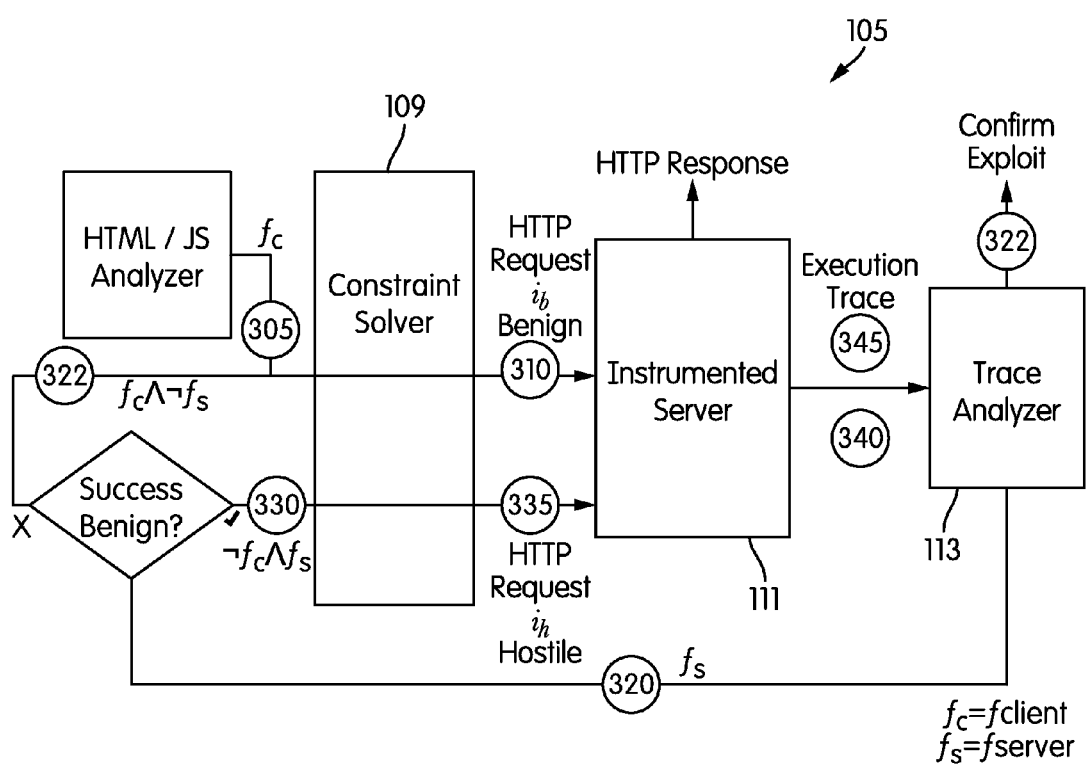
FIG. 9 schematically illustrates the operation of a WAPTEC tool that involves whitebox analysis of security vulnerabilities of the web application of FIG. 1.

The two step approach of WAPTEC is described in more detail in reference to the sequence shown in FIG. 9.

1. Finding Benign Inputs

FIG. 9 schematically illustrates the high-level architecture of the WAPATEC tool 105. The WAPATEC tool 105 is a software program that includes several main components: a HTML/JavaScript Analyzer 107, a Constraint Solver 109, an Instrumented Server 111, and a Trace Analyzer 113. In step 300, when a web page opens in the web application 10, the HTML/JavaScript Analyzer 107 constructs logical formulas representing the constraint-checking function for each form on that web page.

The purpose of a web form that validates user input is to reject inputs that the server 15 will (or in practice should) reject. The converse is also often true: if the web form accepts an input the server 15 will also accept it. Therefore, the constraints the web form checks can be reasonably treated the as an approximate specification for the server's intended behavior. The WAPTEC tool 105 extracts the constraints enforced by the web form (i.e., fclient) using program analysis, which is accomplished by the HTML/JavaScript Analyzer in step 305 of FIG. 9. For our running example, the client formula is quantity≥0 ∧ len(name)≤10 ∧ card ∈ {card-1|card-2} ∧ op="purchase" where the first two constraints are contributed by JavaScript and the rest are derived from HTML.

To find a benign input, the WAPTEC tool 105 starts by using the Constraint Solver component 109 to find any input that satisfies fclient and then submits that input to the server 15 (at step 310). To check whether or not the input reaches a sensitive sink (i.e., is benign), the WAPTEC tool analyzes the code executed by the server 15 using the Trace Analyzer component 113 (at step 315). If the server 15 reaches a sensitive sink, the input is benign. However, sometimes the input fails to reach a sensitive sink because the server 15 enforces more constraints than the client. These extra constraints can arise, for example, because the server 15 has more information than the client 20 (e.g., the list of existing usernames). In the example of FIGS. 7 and 8, the input satisfying fclient might be quantity=3, name="John Doe", card=card-1, op="purchase". The server 15 rejects this input because it requires address to have a non-null value (i.e., address is a required value).

When an input that satisfies fclient fails to reach a sensitive sink, the WAPTEC tool 105 attempts to augment fclient with additional constraints, the intention being that any input satisfying the augmented fclient will lead to a sensitive sink. To compute this augmentation, the WAPTEC tool examines the execution trace of the code the server 15 executed on the failed input, and computes a logical formula representing hat code trace (called fserver, computed in step 320, by the Trace Analyzer 113). The intuition is that fserver represents (the conjunction of) the conditions on the server's inputs that if true will always lead to the same control path. Since that control path fails to lead to a sensitive sink, every input leading to a sensitive sink must falsify one of the conditions on the path (i.e., it must satisfy the negation of fserver). Thus, the augmentation of fclient when no success sink is found is fclient ∧ ¬ fserver (at step 322). In the running example, the augmented fclient would be quantity≥0 ∧ len(name)≤10 ∧ card ∈ {card-1|card-2} ∧ op= "purchase" ∧ required (address), where required(x) means variable x is required to have a value.

This process then repeats, starting with the augmented fclient, finding an input that satisfies it, and iterating until the WAPTEC tool finds a benign input. At a high level, this process generates a series of inputs, where each subsequent input has a better chance of being a benign input than all of the previous.

Once the WAPTEC tool 105 finds a benign input, it performs a depth-limited version of the procedure above to find additional, nearby control paths that lead to sensitive operations. To do that, the WAPTEC tool analyzes the trace to extract fserver, which is a conjunction $C_1 \wedge \ldots \wedge C_n$. For each Ci, the WAPTEC tool adds ¬ Ci to (the augmented) fclient, finds a satisfying input, and checks if that input leads to a sensitive operation. This process is identified as perturbation, since the WAPTEC tool attempts to perturb the constraints leading to one sensitive sink to find additional sinks. Since each C_i can potentially produce a distinct control path leading to a sensitive sink, after this depth-limited search the WAPTEC tool has between 1 and n+1 control paths leading to sensitive operations. The perturbation process is motivated by the intuition that small changes to successful inputs may still drive execution successfully to sensitive sinks, which are often clustered together, and hence after finding a single sink, there is a high likelihood of finding additional sinks nearby. It is noteworthy that the WAPTEC tool does not perturb a path that has no sensitive sinks because all the paths that it would reach by perturbation are already reachable by the augmentation of fclient by ¬ fserver.

2. Finding Hostile Inputs

For each control path the WAPTEC tool finds that leads to a sensitive sink, it attempts to generate inputs that the server 15 ought not accept but that lead to that same sink. Generating inputs the server 15 ought not accept is straightforward: find solutions to the negation of fclient, for if the client 20 rejects a given input, the server 15 will reject it as well (or else the client fails to expose the server's full functionality to users). Generating inputs that cause the server 15 to follow the same control path and therefore arrive at the same sensitive sink is likewise straightforward: find solutions to fserver. Thus, generating inputs that follow the same control path and therefore are accepted by the server 15 but that the server 15 should not accept amounts to finding a solution to ¬ fclient ∧ fserver (at step 330). Conceptually, every such solution amounts to a parameter tampering exploit, but to ensure the input is in fact an exploit, we submit it to the server 15 (at step 335) and ensure it reaches a success sink (steps 340 and 322).

Furthermore, instead of generating one input for ¬ fclient ∧ fserver, the WAPTEC tool generates one input for each disjunct σ in the disjunctive normal form of ¬ fclient by finding a solution to σ ∧ fserver. Each of those inputs satisfies a logically distinct set of constraints and hence is likely to represent a logically distinct vulnerability. Each σ ∧ fserver can be construed as a distinct server-side vulnerability witnessed by one of the exploits WAPTEC finds.

In the example of FIGS. 7 and 8, the negation of fclient is quantity<0 ∨ len(name)>10 ∨ op!="purchase" ∨ card ∈ {card-1|card-2}. There is a control path through the server where fserver includes required (address) ∧ ¬ len(name)>10. Thus, to construct an exploit, the WAPTEC tool uses the Constraint Solver 109 to find one solution to the formula quantity<0 ∨ required (address) ∨ ¬ (len(name)>10) and another solution to the formula len(name)>10 ∧ required (address) ∧ ¬ (len(name)>10). In the first case, the server executes an INSERT operation, and is deemed an exploit (hostile). This exploit illustrates the vulnerability where quantity is given a negative value. The second formula is not satisfiable and therefore there is no exploit reported. An example of the pseudo-code for steps 1 and 2 of the whitebox/WAPTEC approach can be found in Algorithms 1 and 2 shown in FIG. 10.

3. Soundness

The next paragraphs describe at a high level the mechanisms used for generating the client formula fclient and the server formula fserver, and their implications for the correctness of the proposed approach. The client formula fclient is generated by the HTML/JavaScript Analyzer 107 (shown in FIG. 9). The analyzer uses symbolic evaluation to compute the client formula fclient. Since the formula is statically computed from the source, the generated formula is in fact an approximation. Specifically, due to the nature of the approximation, fclient is an under-approximation of the constraints the client enforces, which means that every time an input is generated that satisfies fclient, it is indeed the case that this input will lead to a successful form submission from the client. Similarly, ¬ fclient, represents an over-approximation of input instances that are rejected by the client (e.g., line 7 of the client code in FIG. 8 listing 1). Inputs satisfying ¬ fclient are therefore not necessarily rejected, but we can always execute those inputs in the actual client code to ensure they are rejected by the client.

In the proposed method, the server side behavior is obtained by dynamic analysis of server side code. This means that the server side formula fserver will be specifically tied to each run, and is generated from the program trace induced by the run. By its very nature, dynamic analysis only considers the operations done by code that is executed; hence, fserver precisely captures the server behavior for the run without any approximations.vvSince fserver is precise, and the WAPTEC tool 105 can verify that any solution to ¬ client ∧ fserver$ is actually rejected by the client, all the exploits that the WAPTEC tool reports are concrete parameter tampering exploits. The proposed implementation seeks to find such exploits.

Section B (i.e., Running Example) described several challenges that the WAPTEC tool addresses. Below, the application explains how those challenges are met by the algorithms just discussed.

Multi-Tier Analysis.

The algorithms above are written as though WAPTEC is faced with analyzing only a single program, but in reality there are three programs written in different languages that it must analyze: the web form, the server code, and the database. To reason about the combination of these three programs, WAPTEC analyzes each program individually and extracts the relevant semantics into logical formulas (more specifically the logic of strings). Once the important portions of the three programs are expressed in a common language, reasoning about the combination is much simpler and can be carried out as described in this section. Details on translating web forms into logic, on translating server code (one trace at a time) into logic, and details on translating database code into logic can be found in some of the paragraphs below.

Negative Parameter Tampering.

Discovering attacks that utilize variables not appearing in the client-side web form (i.e., negative parameter tampering attacks) is a natural side-effect of our basic algorithm. Such variables appear in the server-side code, and when the server processes any given input, fserver will therefore include those variables. In our example of FIG. 8, line 14 checks if the variable discount has a value. Therefore, every fserver generated from an input that fails to set discount will always include the constraint ¬ required(discount). When the input fails to reach a sensitive sink, fclient is augmented with required(discount), and when the input succeeds in reaching a sensitive sink, the perturbation process includes required (discount) as one perturbation. In both cases, subsequent attempts to find satisfying inputs require discount to be assigned a value.

Sanitization.

Sometimes before validating user input, the server 15 "sanitizes" those inputs. Sanitization violates the premise that if the client 20 rejects an input so should the server 15. For example, instead of rejecting a name value that is longer than 10 characters, the server 15 truncates name to 10 characters. The WAPTEC tool 105 can avoid triggering false positives for some sanitization cases because of the way it constructs fserver from a trace of the server's code.

D. Architecture and Operation of the WAPTEC Tool

The previous section outlined high level challenges in designing a whitebox analysis tool (i.e., the WAPTEC tool) to detect parameter tampering attacks. As noted, different components of a web application are written in different programming languages. In one embodiment, client side code is written in HTML/JavaScript, server side code is written in server side programming languages such as PHP, JSP, etc., and database schema is written in languages such as SQL. To compute formulas that represent restrictions imposed on inputs, the proposed method needs to bridge the gap between different programming languages and express constraints imposed by them uniformly in terms of first-order logical formulas. Expressing constraints uniformly would then enable generation of benign and hostile inputs by solving formulas involving fclient and fserver.

This section discusses technical challenges faced in assimilating constraints from various components of a LAMP web application and algorithms that address them. For example, fclient is computed from the client-side code and involves analysis of HTML/JavaScript code relevant to a web form. Further, fserver is computed from the server-side code and involves extracting constraints from PHP server-side code (Section) and SQL databases.

1. Extracting Constraints from Client-Side

The client-side web form is typically expressed in HTML and JavaScript both of which encode restrictions on user inputs. The proposed method analyzes HTML code of the web form to extract constraints implied by various form fields (e.g., a drop down menu implies a range constraint on value of the user input). JavaScript validation code associated with the form is symbolically executed to extract conditions that, if satisfied, indicate successful input validation at the client. All restrictions imposed by HTML and JavaScript together then provide the client-side formula fclient. Generation of fclient is based on the method disclosed by the NoTamper tool 65 which provides a detailed treatment.

2. Extracting Constraints from Server-Side

The formula fserver represents server side validation and sanitization of user inputs. To generate fserver, the method first captures a trace comprising of statements that the server 15 executed to process user inputs. For the running example in FIG. 8, FIG. 11 shows the generated trace for inputs card='card-1', name='alice', address='wonderland', op='purchase' and quantity=1. Each line in the generated trace of FIG. 11 corresponds to the line in the example of FIG. 8 that generated it.

To generate fserver, the method needs to identify statements in a trace that correspond to validation/sanitization done by the server side code. The server-side code may perform user input validation and sanitization in the following three ways: a) explicit validation of desired properties of user inputs in conditional statements and b) implicit validation/sanitization of user inputs through inbuilt functions in server-side code and c) implicit validation/sanitization of user inputs by database. In the example of FIG. 8, validation of the card parameter at line 2 illustrates explicit validation, truncation of the name parameter at line 8 illustrates explicit sanitization (as execution of line 8 ensures that value of the name parameter will contain 10 or less characters) and rejection of null value for the parameter address exemplifies database sanitization/validation. The fserver function is essentially computed by identifying and analyzing all the three types of validation/sanitization constructs present in a trace. The method focus on the first two types of validation/sanitization constructs here and the database validation/sanitization is discussed further below Extracting Constraints Due to Explicit Validation.

Explicit validation of user inputs is captured by IF statements appearing in a trace (e.g., four IF statements are shown in the trace in FIG. 11, capturing validation of parameters card, name, op, and discount, respectively). To learn the constraint being checked by an IF statement, the method analyzes its condition argument. Each such condition argument is then repeatedly expanded until it only contains user inputs, concrete values and operators. For example, the IF statement on line 2 of FIG. 11 checks if $main_ca matches 'card−1|card−2'. The proposed method expands $main_ca with $_POST[card] because of the assignment statement on line 1. Intuitively, starting from the IF statement the above process walks backwards in the trace and replaces server-side variables appearing in conditions with values assigned to them until the condition is expressed in terms of inputs, concrete values and operators.

A challenge in precisely capturing explicit validation in IF statements stems from the presence of irrelevant statements. A naive approach that considers all IF conditions as relevant to a sink would report imprecise results. For example, consider the first IF statement in FIG. 11. This IF statement checks the value of parameter card and sets the HTML form to show the selected entry. Although the trace contains check on card, it does not prevent the query computed at line 20 from using malicious values of card. Similarly, a form may contain several parameters but a server side sink may only use some of them. Therefore, the proposed analysis must factor whether a tampered parameter is actually going to be used at a sensitive operation.

The WAPTEC tool 105 identifies conditionals relevant to a given sink by employing data- and control-dependency analysis: the data dependency analysis identifies conditionals that actually contributed data to a sink, and the control dependency analysis identifies conditionals that actually dictated control flow to a sink. For the example of FIG. 8, the query executed at line 20 is neither data nor control dependent on conditional statement at line 2 and hence this conditional is ignored while analyzing sink at line 2.

For the trace in FIG. 11 the above process contributes the following constraints to the fserver formula:

len(name)≤10∧ op="purchase"∧ ¬ isset(discount).

Extracting Implicit Constraints Due to Sanitization.

The server-side sanitization of user inputs may inherently enforce constraints on user inputs. For example, at line 8 of FIG. 8, the server-side variable $n which contains value of the parameter name, is sanitized. In specific, by truncating the name parameter with substr function, the server-side code ensures that after this sanitization the contents of variable $n will have 10 or less characters i.e., it implicitly enforces the constraint len(name)≤10.

The WAPTEC avoids 105 analyzing paths that would result in generating false alarms due to such sanitization. In order to do that, the method revisits the basic process by which WAPTEC identifies paths to a success sink. The method demands that this path is satisfied by an input that satisfies fclient. In the event the server 15 chooses to apply sanitization of input to satisfy fclient, such a path will not be considered by the WAPTEC tool for trace analysis, because a benign input will never traverse that path. For example, in FIG. 8, the statement in line 8 will never be executed by WAPTEC tool.

Nevertheless, an application may have incomplete or partial sanitization. To handle these cases, the WAPTEC tool captures such implicit constraints by analyzing the sink expression (e.g., SQL query), and demanding that fclient be held true by the sink expression. The WAPTEC tool expresses the sink expression purely in terms of user inputs and concrete values by following a process similar to expansion of If conditions. The resulting SQL sink expressions are then parsed with a SQL parser thus identifying data arguments to SQL queries which contain user inputs (or a function of user inputs). Currently, the restrictions on the operators appearing in the sink expression are limited to the language (shown in WAPTEC Table 1 supported by the underlying solver.

TABLE 1

WAPTEC constraint language

| Class | Examples | Instances |
|---|---|---|
| Equality * | =, ≠ | x ≠ y |
| Numeric * | +, *, −, /, <, > | x < 7 |
| Modal | required | required(x) |
| Regex * | ∈, ∉ | x ∈ [abc] * |
| PHP | trim, len, concat | len(x) < len(concat(y, z)) |

3. Extracting Constraints from Database

Database query operations present interesting consequences for approaches that analyze server-side code. With respect to such operations, many security analysis approaches limit their reasoning to reachability, e.g., most tainting approaches aim to find if a tainted data item can reach a database query execution location. Without analyzing outcome of the query execution, such approaches will result in imprecision as database engine may either sanitize hostile inputs to comply with its schema or reject them. For blackbox approaches, database triggered sanitization may result in false alarms. Additionally, whitebox approaches that ignore these constraints may never generate a benign set of inputs that will be truly accepted at the sink. For the example of FIG. 8, without considering database constraint NOT NULL on the address field, it is not possible to generate acceptable benign inputs. Note that this also forbids discovery of legitimately exploitable parameters for such sinks, thus resulting in false negatives e.g., the quantity exploit cannot be constructed without providing a non-null address value.

It is to be noted that, in one embodiment, the database schema is a sequence of SQL queries that creates different tables and views and expresses certain restrictions on data that can be inserted into each column of a table. If we know that a user input u is being inserted into a column c of a table, then all constraints implied on c by the database schema, must be satisfied (if validation) or will be enforced when data is added to the database (if sanitization). However, finding the mapping between u (typically server-side variables) and c (column name in a database table) is challenging as it requires bridging the namespace differences between application code and database schema (i.e., application code and database tables may refer to same data with different names). The WAPTEC tool 105 analyzes database schema and queries issued in traces to build a mapping between server-side variables and database columns which enables it to then express constraints imposed by database in terms of user inputs.

In the first step, this analysis parses the schema of an application's database. For each table creation statement the tool analyzes the column definitions that typically specify constraints on values that can be stored (e.g., "NOT NULL" clause enforces non-null values whereas enum specifies domain of accepted values. The tool handles MySQL formatted schemas and extract such conditions in the solver language.

In the second step, the tool 105 generates a symbolic query for SQL sinks found in traces and parse them. This parsing enables the tool 105 to map table column names to program variables. For example, on parsing a symbolic SQL "insert into T (uid, . . . values ("S_GET (u)", . . . ", the tool can associate column uid of table T to program variable \ S_GET (u). Once this mapping is available, the tool generates constraints by replacing column names with program variables in constraints generated by the first step e.g., if uid column had a NOT NULL constraint, this analysis will yield a constraint (NOT NULL u).

The above discussion highlights the relationships between server variable names, client form field names and database field names as intended by typical web applications. These relations are important from the perspective of sanitization as well. We already discussed a precise way to handle the effect of sanitization that requires the client validation to hold at the sink expression, (and is therefore safe for such operation). However, such an approach needs to make an assumption that the database field corresponding to the sink expression represents a corresponding client form field (that is transformed to the sink expression with some form of sanitization). While the discussions in this section suggest that such an assumption is reasonable across a large class of web applications, and indeed holds in the applications that we analyzed, it is very easy to construe examples where it could break. For instance, consider a (contrived) web application which assigns a sink expression to a value that does not satisfy client validation, and the intention behind such an assignment may be beyond the inference of any automated mechanism. More generally, the above discussion raises the need for a specification that provides a mapping between client inputs and database fields. While such specifications were not needed for all application, the availability of such specifications will be able to broaden the applicability of the tool 105.

E. Implementation of the WAPTEC Tool

To generate fserver, the tool 105 needs a trace of statements executed by the server-side code. The following paragraphs provide the high-level details behind a program transformation that enables PHP applications to generate a trace and facilitate computation of fserver. Generating benign and hostile inputs entails solving logical formulas.

1. Trace Generation Transformation

Computation of fserver entails reasoning about server-side processing of user inputs (e.g., properties of user inputs checked by the server-side code). The proposed method captures the server-side processing of user inputs in traces which contain program statements executed by the server-side code to process user inputs. To generate such traces the tool 105 performs source-to-source transformation of applications written in PHP language. The transformed applications are then deployed and generate traces apart from processing user inputs.

Alternate implementation. The other choice for capturing such traces is to instrument a PHP interpreter itself. Although, this approach requires less effort on a per application basis, it may require extensive changes to the PHP interpreter. Also, there are considerable analysis needs that led us to adopt a program rewriting route. First, the tool needed taint tracking to identify the flow of untrusted inputs. Second, the needs data and control flow analysis required to identify conditions only relevant to the sink. Third, to handle PHP5 object-oriented features, the tool need to unambiguously identify each object in order to avoid name collisions. While these can be done by hacking various internal parts of a PHP interpreter, such changes would generally not be portable across revisions to the interpreter. The proposed implementation does so in a much cleaner fashion while retaining portability across various PHP interpreters and is not broken by revisions to the interpreter.

Avoiding name collisions. Traces are straight-line PHP programs comprising only of assignments, calls to inbuilt functions and IF-THEN statements. A challenge in reporting variable names in traces is caused by the possibility of name collisions. As traces are straight-line programs, all functions (except PHP inbuilt) executed by the web application need to be in-lined. As this in-lining merges variables from several lexical scopes it could result in name collisions and could generate traces that misrepresent run of the web application (e.g., name-collisions could result in traces that incorrectly capture use/reachability of an important variable). To avoid name collisions, program transformation attaches a unique prefix to each variable name being reported in the trace. To compute these prefixes, the tool uses function/method signatures and for variables appearing in classes, a per object unique identifier is used additionally (as described below).

PHP object-oriented features. Object-oriented features are often used in PHP programs. As multiple instantiations of a class yield objects with same methods, method signatures are same for all such objects. Thus prefixing signatures to variable names may still lead to name collisions in object-oriented programs. Further, a member variable can be accessed using multiple namespaces (e.g., by using the this operator (inside methods) or by using names assigned to objects. Although, all such instances are accessing the same memory region, a naive renaming scheme may lose precision by failing to identify these accesses with a single variable name.

The main changes required to classes are for computing unique prefixes for variables. Here, the transformer adds an id member variable to the class definition to hold the unique identifier for each instance of the class. The constructor methods are augmented to initialize the id variable to a unique value. Further, inheritance is inherently handled in this scheme as the id member of inheriting class shadows the id member of base class. With the help of id variable, accesses to a member variable through an object ($o→$member$_1$) or the this operator ($→member$_1$) are uniformly transformed as v_$id_member$_1$. This enables subsequent analysis to correctly identify accesses to a single memory location from disparate namespaces.

As fserver mainly concerns processing of user inputs, the transformer ensures that the generated traces only contain statements manipulating user inputs. The tool uses standard taint tracking techniques to track user inputs and only include statements manipulating tainted arguments in traces. Special care was needed to initialize and propagate taint as PHP recursively defines some of the inbuilt arrays e.g., super global array GLOBALS contains itself as a member.

2. String Solver

The string solver component analyzes logical formulae to construct inputs that are fed to the server 15. Some of those inputs the system was designed to accept, while other inputs are intended to expose server-side vulnerabilities. The string solver component of WAPTEC was built on top of Kaluza a state-of-the-art solver that finds variable assignments satisfying string and numeric constraints. The main challenge in building the string solver component was translating the WAPTEC constraint language into the language supported by Kaluza.

Constraint Language.

The WAPTEC tool 105 allows all boolean combinations of the atomic constraints shown in WAPTEC Table 1. The equality and numeric constraints are standard. Regular expression constraints require a variable to belong to a given regular expression. PHP constraints include functions from PHP and JavaScript such as trim for removing whitespace from the ends of a string and strpos for computing the index at which one string appears inside another string. Kaluza roughly supports those categories of constraints marked with an asterisk, plus functions for computing the length of a string and concatenating two strings. Thus, translating WAPTEC's constraint language to Kaluza's language requires handling modals and PHP functions.

Static Versus Dynamic Typing.

Besides the difference in atomic constraints, there is a more fundamental difference between the constraint languages of Kaluza and WAPTEC. Kaluza requires every variable to have a single type and does not provide functions to cast from one type to another, whereas PHP allows variables to take on arbitrary values. This mismatch makes the translation difficult because some constrains causes a type error in Kaluza but appears frequently in the semantics of PHP (e.g., when defining whether a variable evaluates to true or false).

The proposed WAPTEC approach approximates the semantics of PHP functions with a combination of type inference to detect type mismatches, type resolution to choose one type for mismatched arguments, static casting to convert problematic arguments to the chosen types, and type-based simplification to eliminate constraints that do not actually affect the satisfiability of the constraints but cause Kaluza to throw type errors.

Untranslatable Constraints.

Some of WAPTEC's constraints cannot faithfully be translated into Kaluza's constraint language. For example, PHP employs a number of built-in data structures not handled by Kaluza, and PHP functions often accept and return such data structures. Arrays are difficult to translate to Kaluza because they correspond to an unknown number of variables, and Kaluza expects a fixed number of variables in the constraints.

For constraints that cannot be translated to Kaluza's language, the WAPTEC tool simply drops those constraints, producing a constraint set that is weaker than it ought to be, potentially leading to unsoundness and incompleteness in the search for parameter tampering exploits. However, because WAPTEC always checks if the variable assignment produced by the solver satisfies the original constraints, unsound results are never reported.

Disjunction.

As mentioned above, disjunction is employed heavily by the WAPTEC tool, and while Kaluza handles disjunction natively, the search for parameter tampering exploits sometimes requires finding different solutions for different disjuncts in a set of constraints—functionality Kaluza does not support. Thus, the WAPTEC tool manages disjunctions itself, sometimes converting to disjunctive normal form (DNF) explicitly.

D. Evaluation and Application of the WAPTEC Tool

The effectiveness of the WAPTEC tool 105 was evaluated on a suite of 6 open source PHP applications that were chosen to reflect prevalent application domains in commonplace settings. Table WAPTEC provides background information on these applications (lines of code, number of files, and functionality). The test suite was deployed on a Mac Mini (1.83 GHz Intel, 2.0 GB RAM) running the MAMP application suite, and WAPTEC was deployed on an Ubuntu workstation (2.45 Ghz Quad Intel, 2.0 GB RAM). It is to be understood that WAPTEC can also operate on other platforms.

TABLE 2

Summary of WAPTEC results

| Application | Size (KLOC) | Files | Use | Exploits |
|---|---|---|---|---|
| A | 9.1k | 54 | Image Mgmt. | 2 |
| B | 26.5k | 113 | Blog | 1 |
| C | 144.7k | 484 | Content Mgmt. | 32 |
| D | 6.4k | 21 | News Mgmt. | 1 |
| E | 15.4k | 158 | Real Estate | 3 |
| F | 9.4k | 59 | Blog | 6 |

Experiments.

The WAPTEC approach was evaluated by conducting two sets of experiments. In the first set of experiments, WAPTEC automatically analyzed the chosen web forms and identified parameter tampering exploits that are correct by construction. In the second set of experiments, the NoTamper tool 65 (i.e., the blackbox version of WAPTEC) was used on the same web forms The results of the two experiments were compared to quantify the benefits of using whitebox analysis over blackbox analysis in the context of parameter tampering attacks.

Results Summary.

The outcome of the first set of experiments (i.e., WAPTEC) is summarized in WAPTEC Table 2. The experiment evaluated one form in each application. The WAPTEC tool found a total of 45 exploits. All exploits were then manually verified. For each application shown in column 1, the last column shows reported exploits. As shown in this table, WAPTEC successfully generated one or more exploits for each application in the test suite underscoring a widespread lack of sufficient replication of the client-side validation in the corresponding server-side code.

1. Comparison of Whitebox and Blackbox Results

The results of the comparison are summarized in WAPTEC Table 3. For each application (column 1), the table reports the number of confirmed exploits found by the NoTemper tool 65 (column 2) and the WAPTEC tool (column 3). The next two columns report false positives reported by the NoTemper tool 65 (column 4), which were eliminated in WAPTEC, and false negatives reported by the WAPTEC tool that the NoTemper tool 65 failed to find (column 5). In total, the blackbox approach resulted in 23 false positives, and 24 fewer confirmed exploits when compared to the whitebox approach. Further, for some web applications WAPTEC found several exploitable sinks for each negated disjunct of fclient e.g., for application C column 3 shows 16 (32)—each hostile input generated by negating 16 fclient disjuncts was used in 2 distinct sinks and hence were exploitable (total 32 exploits). These disjuncts would have contributed to one hostile each, at best, in NoTamper.

TABLE 3

Comparing whitebox and blockbox analysis results

| Application | Conf. Exploits BlackB. | Conf. Exploits WhiteB | False Pos. Blackbox | False Neg. Blackbox |
|---|---|---|---|---|
| A | 2 | 2 | 1 | 0 |
| B | 1 | 1 | 0 | 0 |
| C | 13 | 16(32) | 9 | 19 |
| D | 1 | 1 | 0 | 0 |
| E | 3 | 3 | 1 | 0 |
| F | 1 | 5(6) | 12 | 5 |
| Total | 21 | 45 | 23 | 24 |

2. Complexity and Performance

For each evaluated application, WAPTEC Table 4 illustrates the complexity of generated formulas (column 2—client-side constraints, column 3—server-side constraints, column 4—database constraints), average size of generated traces (column 5—kilo bytes) and average time taken to run the tool (column 6—seconds).

TABLE 4

Additional WAPTEC results

| Application | Formula Complexity | | | Avg. Trace Size (KB) | Time (Sec) |
|---|---|---|---|---|---|
| A | 11 | 5 | 11 | 5 | 41 |
| B | 37 | 1 | 1 | 1 | 4 |
| C | 187 | 2 | 48 | 135 | 10,042 |
| D | 1 | 1 | 1 | 1 | 12 |
| E | 20 | 2 | 8 | 10 | 60 |
| F | 37 | 5 | 4 | 738 | 2,082 |

The most notable application we tested, application C, included the largest formula complexities, the largest number of exploits, and the longest running time. The larger the formula complexity, the larger and more complex the form; hence, a longer running time is to be expected. The large number of exploits is partially attributed to large formula complexity because the potential number of exploit generation attempts is larger; however, the presence of a large number of confirmed exploits points to poor server-side validation of inputs.

In a preliminary analysis of the chosen applications, the testers selected forms that contained interesting client side specifications and collected login credentials necessary to access them. The testers also extracted form action parameters in cases where applications reused processing code between multiple forms. These hints were necessary to facilitate automatic analysis and to restrict exploration of server-side code pertaining to other forms. Overall, it required typically less than 5 minutes to collect this data for each form.

III. A Tool and a Method for Protecting Web Application from Security Vulnerabilities and Parameter Tampering Attacks.

As disused above, security vulnerability and parameter tampering attacks are dangerous to a web application whose server 15 fails to replicate the validation of user-supplied data that is performed by the client. Malicious users who circumvent the client 20 can capitalize on the missing server validation. This application further discloses a method and a software tool called TamperProof that offers a novel and efficient mechanism to protect web applications from parameter tampering attacks. TamperProof is an online defense deployed in a trusted environment between the client 20 and server 15 and requires no access to, or knowledge of, the server side codebase, making it effective for both new and legacy applications. The TamperProof uses the information extracted from by the NoTamper tool 65 and the WAPTEC tool 105 to efficiently prevent all known parameter tampering vulnerabilities of web applications.

A. Introduction and Summary

One way to avoid parameter tampering vulnerabilities is to enforce a web application's server-side validation code to perform checks that are at least as strict as those performed by the client side validation code. Manually guaranteeing this is challenging—the server 15 and client 20 are usually written in different languages, often in separate processes by different development teams. This often results in inconsistencies between the client side and server side logic, leading to vulnerabilities that can be exploited. Manual resolution of such inconsistencies can be difficult, error-prone and ex-pensive. We therefore seek automated solutions to defend against attacks that exploit these vulnerabilities.

A major hurdle in attaining automatic solutions to parameter tampering avoidance is that most web applications are server-side scripted (i.e., written in server side scripting languages such as PHP or Java). In many such applications, the client program is not a static piece of code; rather, it is dynamically generated by a server side script, whose out-put varies from one HTTP request to another depending on the input values received, the server's session state, and the database state. An automatic parameter tampering defense therefore has to deal with every possible client generated by the web application's server. This case is vastly different from that which involves a single fixed client.

In the case of dynamically generated clients, a defense against parameter tampering must identify the permissible inputs for every HTTP request to determine whether or not one of the clients generated by the server could have sent the request. Today's web applications do not routinely maintain sufficient information to make this decision. Consequently, any parameter tampering defense aiming to avoid both false negatives (permitting parameter tampering at-tacks) and false positives (rejecting legitimate submissions) must compute and store the relation between requests and client. Obviously, to be usable, it should do that efficiently.

The goal of the proposed method is to offer an efficient defense against parameter tampering attacks that addresses the challenges in a running client-server application. The proposed TamperProof tool presents a trans-parent solution for the prevention of parameter tampering attacks, which is suitable for clients generated by server-side scripted web applications. TamperProof is based on viewing web clients as specifications of intended server behavior, extracting those specifications, and enforcing them on the server.

TamperProof is deployed in an environment between client 20 and server 15 and intercepts all communication between them. Each time the server 15 generates a new client 20, TamperProof extracts the specifications (i.e., description of one or more validation checks) of the inputs that the client 20 permits. Each time a client 20 submits inputs to the server 15, TamperProof validates those inputs against that client's specifications. In other words, the software tool enforces the one or more validation checks on inputs performed by the client on each input that is submitted to the server. When a submission fails to meet its specifications, it is flagged as an attack and rejected. TamperProof is designed to be a wrapper around the server 15 and requires neither modification nor analysis of the server's code base, thereby ensuring it can protect both legacy and new web applications. Furthermore, TamperProof defends against a certain class of workflow attacks.

B. Running Example

Figure 12:
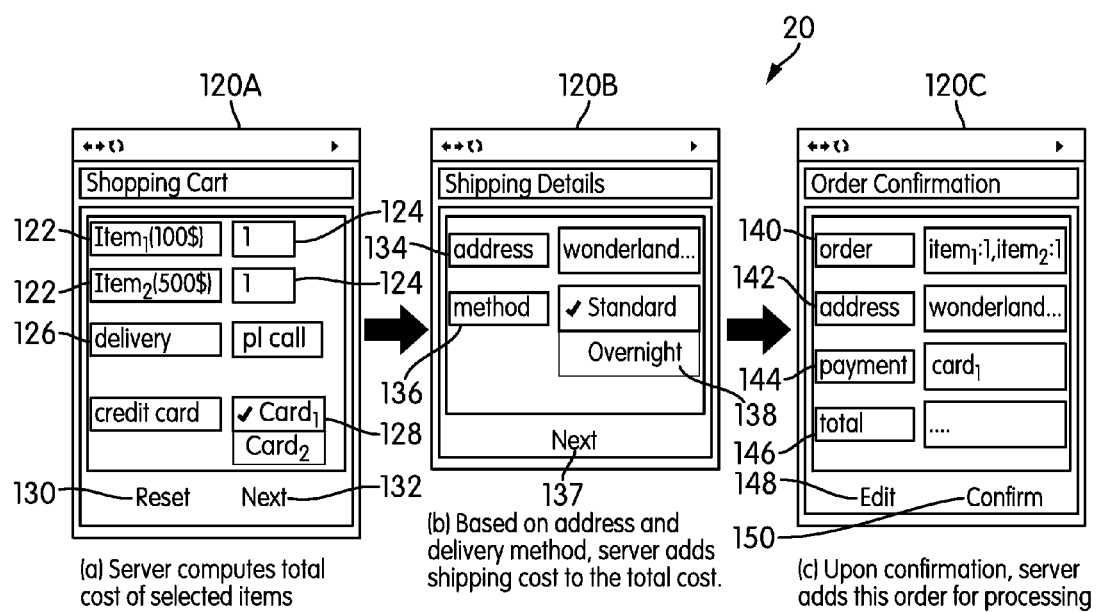
FIG. 12 illustrates three client forms that are part of a web application of FIG. 1.

FIG. 12 illustrates three client forms 120A-C that are part of a typical online purchase process. This example is based on a real-world parameter tampering exploit found on a shopping website. The Shopping Cart form 120A includes two item fields 122 next to two item quantity fields 124, a delivery instructions filed, 126, a credit card filed 128 (displayed in a drop down list of previously used cards), a reset button 130, and a next button 132. The illustrated Shopping Cart form 120A shows two products in the item fields 122 selected by a user for purchase and solicits a quantity for each product in item quantity fields 124.

When the user submits the form 120A, the client-side JavaScript verifies that the specified quantities for the selected products are positive and delivery instructions contain 30 characters or less. If any of these conditions are violated, the JavaScript code cancels the submission and prompts the user to correct the mistakes. Otherwise, the user inputs quantity1, quantity2, card and delivery (that correspond to fields 122, 128, and 126 respectively) are sent to the server 15. The server 15 then computes the total cost of the requested products and generates the Shipping Details form 120B. This form asks the user where and how the products should be shipped. The form 120B includes an address filed 134, shipping method filed 136 with a drop-down menu 138, and a next button 137. When the user submits the form 120B her shipping information is sent to the server 15, who computes the shipping cost, adds it to the total cost, and generates a read-only Order Confirmation form 120C. The form 120C includes an order summary filed 140, an address filed 142, a payment type files 144, a total filed 146, an edit button 148, and a confirm button 150. Once the user confirms her purchase by submitting the Order Confirmation form 120C, the server 15 places her order and the transaction is complete.

Basic Parameter Tampering Attack.

In one situation, the server-side code that processes the shopping cart 120A submission fails to check if the values of the inputs quantity1 and quantity2 are positive numbers. In this form, a malicious user can bypass client side restrictions (by disabling JavaScript) and submit a negative number for one or both products. It is possible that submitting a negative number for both products would result in the user's account being credited. However, that attack will likely be thwarted because of differences in credit card transactions on the banking server responsible for debit and credit operations. However, if a negative quantity is submitted for one product and a positive quantity is submitted for the other product so that the resulting total is positive, the negative quantity acts as a discount on the total price. For instance, in FIG. 1, if the values for quantity1 and quantity2 were −4 and 1 respectively, the end result would be an unauthorized discount" of $400.

Negative Parameter Tampering Attack.

In another situation, the web application 10 is designed to give all employees a 10% reduction in their total costs. One (poor) way to implement this feature is to include on every employee form a hidden field ediscount=1 that when present causes the server to subtract 10% from the total price. A malicious user (non-employee) can launch a negative parameter tampering attack to gain the employee discount by modifying her form to include ediscount=1 (a field not originally present on the form).

Tampering Based Workflow Attack.

Finally, consider the sequence of forms the server 15 intends the user to navigate: the Shopping Cart 120A, the Shipping Details 120B, and the Order Confirmation 120C. If the server 15 does not require the user to follow this sequence, it is vulnerable to a workflow at-tack, wherein the user can skip one or more steps in the above sequence. For example, a malicious user could manually submit the Order Confirmation form 120C and choose the products, quantities, shipping costs, and total cost. This attack (a generalization of the attack on quantities described earlier) enables a malicious user to drive the total cost to a value close to zero.

C. Overview and Implementation

1. Problem Description

The above discussion illustrates the basic nature of parameter tampering attacks. In the following paragraphs, these attacks are represented as violations of constraints the server 15 intended to impose on the submission and processing of user inputs.

Definition 1 (Input).

We define an input received by a server 15 from a client 20 as a set of field name/value pairs: I={(N1; V1i); (N2; V2), ..., (Nn; Vn)}. A server 15 receives a sequence of such inputs, and each time a new input arrives the server 15 must decide whether or not the sequence up to that point in time constitutes an attack on the server 15 and accept or reject the new input accordingly.

$$I_1, I_2, I_3, \ldots, I_k, \ldots$$

Intuitively, a malicious user can launch an attack in three conceptually separate ways: tamper with the field names in the inputs, tamper with the field values in the inputs, or tamper with the order in which inputs arrive. Intuitively, each type of attack violates a constraint the server 15 intended to enforce on its inputs—a constraint defined by the form used to submit each input (if one exists). Thus, we associate with every input I the form $F_1$ used to submit it. Below we describe the three constraints corresponding to each at-tack: the Field Constraints, the Value Constraints, and the Workflow constraints, respectively.

Field Constraints.

Field Constraints dictate which field names an input is allowed to include. The Field Constraints for input I are usually implicit in the form $F_1$ because the only field names the form submits are those included in it. Given a form F and input I, I satisfies the Field Constraints of F if the set of field names in I is a subset of fields present in F. Enforcing Field Constraints on the example of FIG. 12 prevents the employee discount attack.

Value Constraints.

Value constraints dictate which data values can be assigned to which field names in an input. The Value Constraints for input I are enforced by form $F_1$ either through its JavaScript (e.g., the product quantities in the Shopping Cart form 120A) or its HTML (e.g., the length restriction on the delivery instructions). Given a form F and input I, we say that I satisfies the Value Constraints of F if when I's values are inserted into F's fields, the form allows the input to be submitted to the server. Enforcing Value Constraints in the example of FIG. 12 prevents the product quantity attack described earlier.

Workflow Constraints.

Workflow Constraints ensure that inputs are sent to the server 15 in a plausible order. Plausible order means that at the time input I is submitted, form $F_1$ has already been generated by the server 15. This simple condition ensures that many of the server's intended Workflows are respected. If the server intends for form A to precede form B, then it is likely that form B will only be generated in response to the inputs from form A. Input sequence I1; I2; ... satisfies the Workflow Constraints if for every input $I_j$, $F_1$ was generated before I was submitted.

Enforcing the Workflow Constraints prevents the Workflow attack in the example of FIG. 12 where the Order Confirmation form 120C is submitted before the Shipping Details form 120B. The only way to generate the Order Confirmation form 120C is by submitting the Shipping Details form 120A and thus at the time the attacker submits the Order Confirmation form's inputs, that form has not yet been generated.

2. High Level Challenges

Existing applications do not facilitate the enforcement of the above constraints. To enforce the Workflow Constraints, the server 15 needs to verify that one of the forms it already generated could have been used to submit each input. To enforce Field and Value Constraints, the server needs to know which form was used to submit each input and verify that the input was permitted by that form.

As shown during evaluation, typical applications fail to systematically enforce these constraints. Field and Value constraints are sometimes manually enforced by adding code to the server 15, but in practice this often leads to mismatches in client and server enforcement and therefore to parameter tampering vulnerabilities.

To address tampering attacks in legacy applications, the constraints above must be inferred so that they can be enforced. Two common approaches for inferring such constraints come from the literature on intrusion detection. One approach involves learning such constraints through machine learning. The main drawback of this approach is that it is challenging to simulate a comprehensive learning phase for a complex web application. Any legitimate behaviors missed during such a learning phase will result in non-malicious users having their inputs rejected for no reason.

An alternative approach for inferring these constraints is through the use of static analysis of the server's source code. However, this is extremely difficult. Consider any form generated by a server 15 which is based on: inputs from a prior form, the state of the session and the state of the database, each of which evolves with the continued deployment of an application. The many different control flows in the source code may lead to forms that differ based on the state of the execution. There may be a form unique to each user of the application, encoding restrictions unique to the user. In the example of FIG. 12, credit card records of a user are retrieved from the database and used to populate a drop down credit card menu 126 in the form. This drop down menu 126 in turn encodes a range restriction on credit cards a user can select. Whenever the user supplies a new credit card information, the credit card information in the database changes. This server side state change reflects in the generated form and consequently the constraints implied by the drop down menu too change overtime. The constraints therefore depend on the state of the web application at any point in time, and analysis techniques that aim to infer those constraints purely from source code face a difficult challenge.

3. TamperProof Approach Overview

Figure 12A:
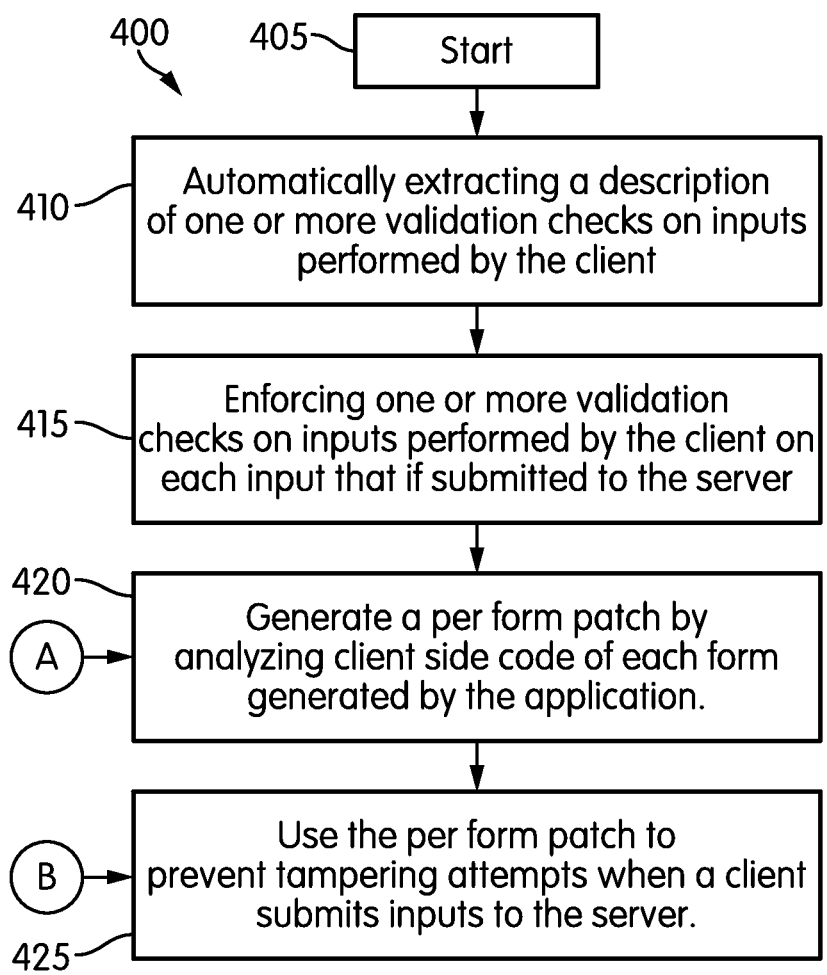
FIG. 12A illustrates a method for preventing parameter tampering attacks in web applications that is performed by a TamperProof tool.

The key idea in the proposed TamperProof tool or approach is illustrated in FIG. 12A. FIG. 12A illustrates a method 400 for preventing parameter tampering attacks in web applications that is performed by the TamperProof tool. In one embodiment the method is performed by the TamperProof tool. As described above, the method 400 begins with identifying a plurality of constrains (e.g., Workflow, Field, and Value constrains) related to inputs from a client 20 to a server 15 in a web application 10. In other words, the tool automatically extracts a description of one or more validation checks on inputs performed by the client (at 410). Next, the method dynamically enforces the one or more validation checks on inputs performed by the client on each input that is submitted to the server (at 415). This avoids the precision issues associated with static analysis and learning approaches. Dynamic approaches come at the cost of some performance, and the system develops techniques to improve performance. After that, the method generates a patch (e.g., a per form patch) by analyzing client side code of each form generated by the application (at 420). Finally, the method uses the patch to prevent parameter tampering attempts when the client 20 submits inputs to the server (at 425). Details of the describe method are provide below.

Once constraints are identified, they are placed as patches (i.e., filters) at a web application proxy that enforce these constraints on incoming inputs from clients. Enforcing these patches in a proxy simplifies our implementation and has the added benefit that our approach is applicable regardless of the platform used to implement the server. To infer and enforce constraints on server inputs, the proposed approach uses the Enforcing Workflow Constraints algorithm and Enforcing Field and Value Constraints algorithm.

Enforcing Workflow Constraints.

To enforce these constraints, the algorithm ensures that every non-malicious input is mapped to the form used to submit the input. To implement this idea, the algorithm dynamically instruments every form generated by the server 15 to include a hidden field with that form's identifier. Any input that arrives at the server without such an identifier (or with a spurious identifier) is rejected.

Enforcing Field and Value Constraints.

To enforce the one or more validation checks on inputs performed by the client, the algorithm verifies that every non-malicious input could have been submitted by the form associated with that input (as described above). To implement this idea, the algorithm dynamically analyzes each form generated by the server 15 to extract the constraints enforced by HTML and JavaScript and record which form identifier corresponds to which constraints. Any input that arrives at the server 15 and does not satisfy the constraints corresponding to the form used to submit the input, is rejected.

Figure 13:
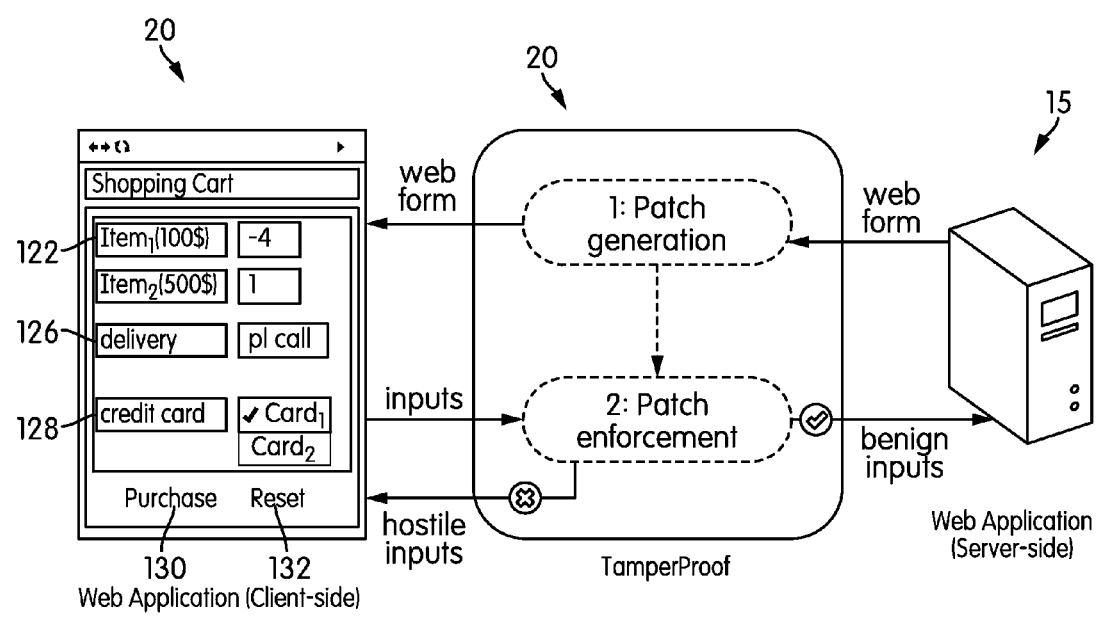
FIG. 13 schematically illustrates the TamperProof tool 1 that prevents parameter tampering attacks in web applications.
Figure 13A:
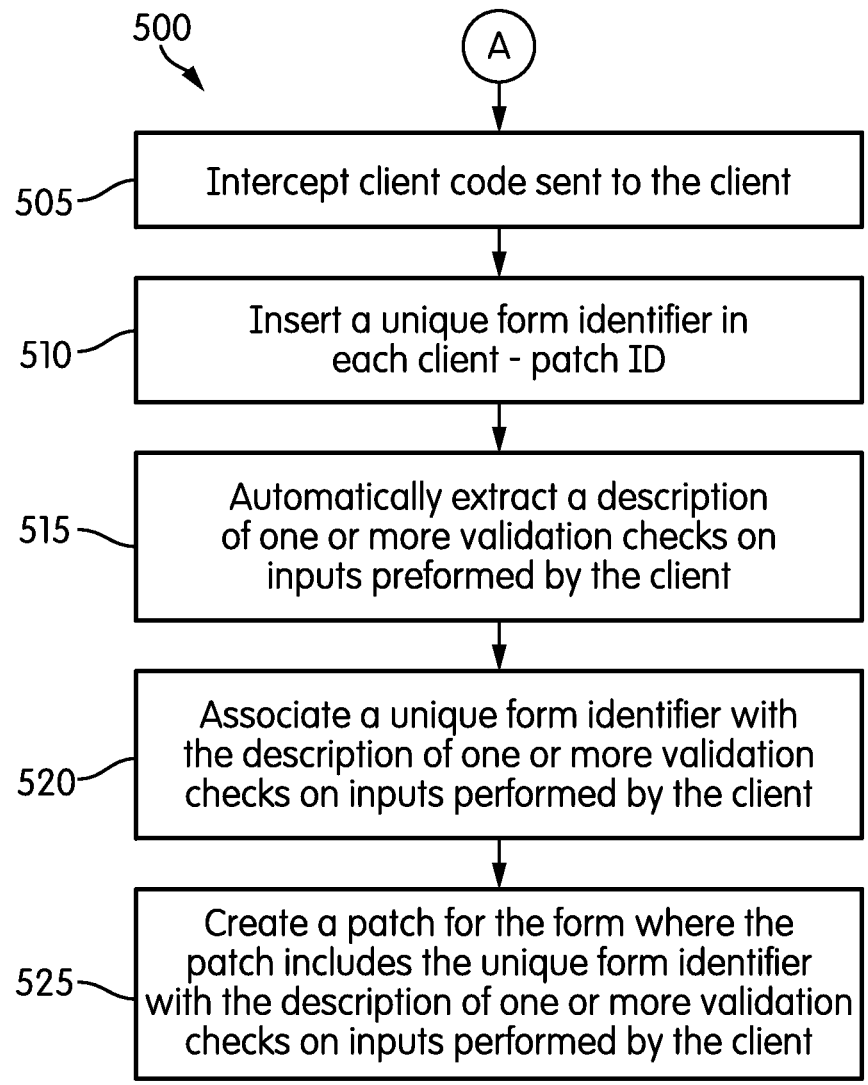
FIG. 13A shows a Patch Generation algorithm performed by the TamperProof tool.
Figure 13B:
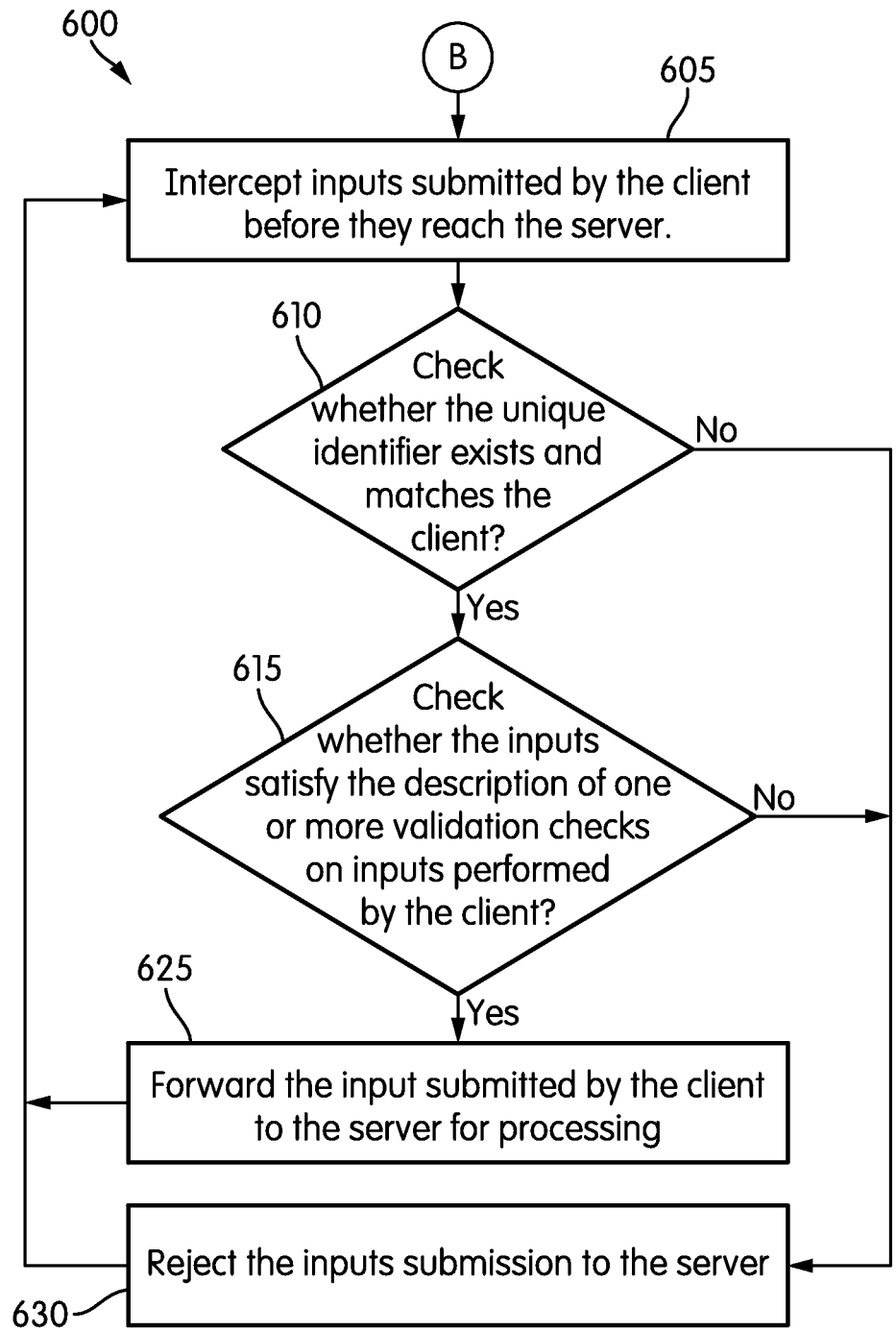
FIG. 13B shows a Patch Enforcement algorithm performed by the TamperProof tool.

FIG. 13 schematically illustrates the TamperProof tool 155 that prevents parameter tampering attacks in existing applications. In essence, the Tamper-Proof tool generates a patch (e.g., a per form patch) by analyzing client side code of each client generated by the application 10 and then uses the patch to prevent parameter tampering attempts when a client 20 submits inputs to the server 15. FIGS. 13A and 13B present a functional overview of these two steps, which are discussed in more detail below.

FIG. 13A shows a Patch Generation algorithm 500 performed by the TamperProof tool 155. In the first step, the TamperProof 155 intercepts the server's communication with the client (at 505). In each client, TamperProof inserts a (randomly generated) unique identifier (e.g., a form identifier), which for brevity we call the patch ID (at 510). TamperProof then automatically extracts a description of one or more validation checks on inputs performed by the client (at 515). For example, TamperProof extracts Field and Value constraints enforced by this client. More precisely, TamperProof first analyzes the HTML to extract the Field constraints as well as a few Value constraints. It also analyzes JavaScript (using standard symbolic evaluation techniques) to extract the remaining Value constraints. The tool 155 then associates the unique identifier with the description of one or more validation checks on inputs performed by the client (at 520). Finally, the toll 155 creates a patch for the client, where the patch includes the unique identifier with the description of one or more validation checks on inputs performed by the client (at 525). For example, the combination of the patch ID, the Field, and the Value constraints represents the created patch for the client.

For the Shopping Cart form 120A in the example of FIG. 120A, the Field constraints TamperProof extracts is a simple set of field names: {quantity1; quantity2; card delivery}. The Value constraints are captured by the following logical formula.

$$quantity_1 \geq 0 \wedge quantity_2 \geq 0$$
$$\wedge \ delivery \in [a - zA - Z]*$$
$$card \in (card_1 | card_2)$$

The permitted credit card selections depend on the application's backend database, which means that if the user requests the Shopping Cart form 120A twice her credit card options may be different each time. Because patch generation is performed each time a form is generated, the Value constraints will always properly reflect the user's actual options at the time she submits her data.

FIG. 13B shows a Patch Enforcement algorithm 600 performed by the TamperProof tool 155. In the first step, the Tamper-Proof tool 155 intercepts inputs submitted by the client before they reach the server (at 605). Then, Tamper-Proof checks whether the unique identifier exists and matches the client 20 (at 610). The TamperProof tool also checks whether the inputs satisfy the previously associated description (at step 520 in FIG. 13A) of one or more validation checks on inputs performed by this client (at 615). The inputs submitted to the server are rejected if the method fails any of these checks (at 630). Otherwise, the inputs submitted by the client are forwarded to the server 15 for normal processing (at 625).

The following two form submissions show values assigned to various fields in the Shopping Cart form 20. The Tamper-Proof tool 155 forwards the first submission to the server q5 because it satisfies all the Field and Value constraints, but it rejects the second submission because quantity1 is negative, violating the Value constraints.

$$\{quantity_1 \rightarrow 1, quantity_2 \rightarrow 1, delivery \rightarrow \text{"call"},$$
$$card \rightarrow card_2\} \quad \quad 1.$$

$$\{quantity_1 \rightarrow -1, quantity_2 \rightarrow 1,$$
$$delivery \rightarrow \text{" "}, card \rightarrow card_1\} \quad \quad 2.$$

Comparison with Cross-Site Request Forgery (XSRF) Token Defenses.

The proposed instrumentation of forms with a unique identifier bears similarity to token-based XSRF defenses. Such XSRF defenses obviously fail to prevent parameter tampering attacks, but they can protect against some Workflow attacks, depending on how the XSRF tokens are generated. If the XSRF token is the same for all forms and pages for a user's session, then it does not protect against Workflow attacks (same token can be used in submitting forms that bypass Workflow steps) and is therefore strictly weaker than TamperProof. But if the XSRF token is unique for each form, then it protects against those Workflow attacks that do not violate Value or Field constraints (e.g., tampering hidden fields indicating next step in the Workflow). In this sense, TamperProof offers robust defense against parameter tampering and a certain class of Workflow attacks while also subsuming the protection offered by existing XSRF defenses.

D. Security and Performance

The practical effectiveness of tool 155 he TamperProof depends crucially on two things: that it is secure against attacks and that it performs well enough for real-world web applications.

1. Security

The following paragraphs provide a conceptual description of what a patch form is, how it is generated, and how it is enforced. In this section the application expands on these ideas to ensure that TamperProof is robust against a series of attacks that attempt to violate the Field, Value, and Workflow constraints of the application as well as the mechanisms TamperProof uses to enforce those constraints.

The key insight is that inserting a patch ID into a form gives a malicious user another field to tamper with. For Tamper-Proof to be secure it must ensure that a form's patch ID field is itself tamper proof. Tampering with a patch ID is useful because different forms have different constraints, and some constraints are more permissive (i.e., weaker) than others: weaker constraints reject fewer inputs and hence are better for attackers. By submitting a patch ID for a form with weaker constraints, an attacker can try to fool TamperProof into accepting data that violates the constraints on her actual form.

Making a form's patch ID tamperproof only requires expanding the notion of a patch to include one additional piece of information about each form: the URL to which that form submits its data. Thus, the patch generation phase must extract the target URL for each form and tie it to the form's patch ID, and the patch enforcement phase becomes the following sequence of checks.

1. patch ID exists
2. server has a record of patchID
3. the data fields are a subset of those for patchID
4. the URL is the same as that for patchID
5. the data satisfies the constraints for patchID If any of the above check fails, the TamperProof tool 155 rejects the submission as a parameter tampering attack. Otherwise, it forwards the submission to the web application as usual and deletes the patch ID entry from memory. Below we describe how this enforcement algorithm defends against attacks.

Basic Parameter Tampering.

Basic parameter tampering attacks are those where an attacker submits data to the server that violates the form's Value constraints. In the example of FIG. 12, a submission where quantity1 is negative (to obtain an unauthorized discount) constitutes a basic parameter tampering attack. TamperProof rejects such an attack at Check 5.

Negative Parameter Tampering.

Negative parameter tampering attacks are those that violate the form's Field constraints (the set of permitted field names). In the example of FIG. 12, a non-employee submission that includes the ediscount field (to gain a 10% discount), would constitute a negative parameter tampering attack. Tamper-Proof rejects such attacks at Check 3.

Workflow Attacks.

A Workflow attack is one that violates the form's Workflow Constraints. In the example of FIG. 12, submitting the Order Confirmation form 120C before the Shipping Details 120B form constitutes a Workflow attack. TamperProof rejects such attacks at Checks 1 and 2 because the out-of-order submission could not have been submitted from a properly generated form, all of which have patch IDs.

Replay.

Replay attacks are those where two different submissions include the same patch ID. TamperProof rejects such attacks with high probability because once it receives the first submission, it deletes that patchID from memory, and hence unless the patchID was regenerated (a low probability event) the second submission will be rejected because the patchID does not exist.

PatchID Spoofing.

PatchID spoofing attacks are those where the attacker generates a brand new patchID, attempting to forge a valid submission. TamperProof rejects such attacks with high probability because patchIDs are randomly generated and are therefore unpredictable for an attacker (i.e., Check 2 fails). This defense has the added benefit of protecting against cross-site request forgery at-tacks (XSRF), since the patchID is effectively a one-time use XSRF token (i.e., Check 1 fails for XSRF attacks).

PatchID Swapping.

PatchID swapping attacks are those where a malicious user legitimately requests two forms, A and B, and then submits data for form A using the patchID from form B. In the example of FIG. 12, a user could request a Shopping Cart form 120A and a Shipping Details form 120B. Then she could choose her own shipping costs by submitting the Shopping Cart form 120A with the field shipping Costs and the Shipping form's patchID.

For patchID swapping attacks, TamperProof either identifies the request as an attack and rejects it or forwards the request on to the application because the attacker could have generated exactly the same request without any tampering. The cases where the attack is rejected are simple: (i) the request includes fields that form B does not (and hence Check 3 fails), (ii) the request's URL differs from that of form B (and hence Check 4 fails), (iii) the data submitted violates B's constraints (and hence Check 5 fails). Note however that if the request is not rejected, this "attack" uses exactly the same fields and URL as form B, and thus satisfies the constraints on form B. Hence, the attacker can generate exactly the same request without any parameter tampering by simply filling out form B directly. Thus, the attack is not an attack at all, despite it being generated with malicious intent. Indeed, TamperProof should and does forward the request on to the application. In the example of FIG. 12, if a user attempts to skip the Shipping Details form 120B by supplying too low (or high) a shipping cost, she fails, but if she supplies exactly the right shipping costs, she succeeds.

While the TamperProof tool 155 is robust against an attacker swap-ping patchIDs for forms she legitimately has access to, it may be vulnerable if the attacker steals the patchID for an-other user's form. In effect, TamperProof uses the presence of the patchID in the submission to signal that the current user has the right to submit data to this form. The effectiveness of TamperProof defense relies on secrecy of "active" patchIDs (i.e., patchIDs of forms that have been sent to client but have yet not been submitted). If such a patchID is leaked, it may allow parameter tampering at-tacks in some applications. For example, consider a form A that could be displayed to both authenticated users and to general public (with more stringent client side validation). If an authenticated user leaks her form patchID before she submits it, an attacker can submit data with less stringent client-side validation. Although convoluted, the above scenario depicts the importance of guarding active patchIDs much the same way we guard cookies or XSRF tokens.

2. Efficiency Issues

The other practical concern for TamperProof is whether or not it is sufficiently efficient to be deployed on real-world web applications. Here there are two metrics of interest: the time required for the server 15 to generate a single page (latency) and the number of requests the server 15 can support per second (throughput). TamperProof has been designed to minimize its impact on both metrics.

Latency.

Latency reflects how a single user perceives the performance of a web application 10. It is the amount of time required for the web server to generate the results of a single HTTP request. TamperProof incurs some over-head for all HTTP requests because it uses a proxy, but the main overheads are when the server generates a web form or processes a web form submission.

For web form generation, TamperProof must analyze the HTML produced by the server (to extract the patch) as well as add a patchID to each form. The key insight to avoiding high latencies is that there is a (sometimes significant) window of time from when the user requests a form to when the user submits the form for processing. The only thing that must be done before the form is sent to the user is that its patchID must be inserted. The rest of the analysis can take place on the server 15 while the user is filling out the form. For each form request, TamperProof returns the form after inserting a patchID and spawns another thread to do the patch extraction. Thus its latency overhead is the cost of inserting patchIDs, which is no more than the over-head of proxy-based XSRF prevention solutions.

Throughput.

Of course, the server 15 must still analyze the HTML page to extract the expected fields, the target URL, and the constraints for each form/lanalysis that can significantly reduce a server's throughput (requests handled per second). The dominating cost in this analysis is extracting the constraints from the JavaScript embedded in each page (e.g., the quantity of each product must be positive).

Fortunately, not all of the JavaScript appearing in a form needs to be analyzed. TamperProof begins by isolating the JavaScript that effects form submissions into what we call the page's JavaScript signature (the code run when the user submits the form). The JavaScript signature implicitly represents the set of constraints that are enforced by the form. Once that signature is identified, TamperProof applies symbolic execution to extract the constraints, a process that can be expensive because it may result in analyzing all possible code paths.

The key insight to reducing the overheads of JavaScript analysis is that in many web applications, much of the JavaScript is the same across web pages. More to the point, it is common that the JavaScript code for constraint checking is the same across many different pages (even if those pages differ significantly in terms of their HTML). In the example of FIG. 12, a profile page might allow a logged-in user to change her personal information. The JavaScript validation code will be the same regardless of which user is logged in, but the HTML constraints for each page may differ substantially (e.g., each user has her own list of previously used shipping addresses). This means that caching the results of JavaScript analysis can greatly improve throughput.

To this end, TamperProof caches the results of JavaScript analysis. Each time it generates the JavaScript signature for a page, it canonicalizes that signature (e.g., alphabetizing the list of function definitions) and checks to see if that canonicalized signature is in the cache. If it is, it uses the constraints from the cache. Otherwise, it performs JavaScript analysis and adds a new entry to the cache. To avoid memory problems stemming from web applications with many distinct JavaScript signatures, TamperProof limits the size of the cache (to a value chosen by the web developer), keeps counters representing the relative frequency with which cache entries are used, and replaces the most infrequently used cache entry when the cache becomes full. By adjusting the cache size, the developer can balance the needs of high-throughput and low-memory consumption.

3. Implementation of the TamperProof Tool

Algorithms 1, 2, and 3 describe TamperProof in more detail. TamperProof-to User (Algorithm 1) runs when-ever the proxy forwards a web page generated by the server to the user. It embeds patchIDs into all the forms and links on that page, forks off a thread to analyze that page, and returns the modified page, which is then returned to the user.

---
Algorithm 1 TAMPERPROOF-TO USER(html)
---
1: html := add-patchids(html)
2: for(analyzeClient,html)
3: return html
---

Analyze Client (Algorithm 2) is the code that is run between a form request and the corresponding form submission: it extracts the patch for that form.

---
Algorithm 2 ANALYZECLIENT(html)
---
1: for all forms f in html do
2:    js := javascript-signature(html)
3:    id := find-patchID (html)
4:    (url, fields, constraints) := codeAnalysis(html,js)
5:    patches[id] = (url, fields, constraints)
---

TamperProof-from User (Algorithm 3) runs every time the user submits a request to the server 15. When the user requests one of the entry pages (landing pages for web applications), TamperProof simply forwards it to the server as such requests could be made directly and thus may not legitimately have patchIDs. For a non-entry page, TamperProof either identifies a parameter tampering attack or returns the original request, which is then forwarded to the server.

---
Algorithm 3 TAMPERPROOF-FROM USER(request)
---
1: if request.url ∉ Entries then
2:    id := request.data['patchID']
3:    if id ∉ patches.keys() then return error
4:    wait until patches[id] is non-empty
5:    (url, fields, constraints) := patches[id]
6:    if request.data.keys()⊈ fields then return error
7:    if !sat (request.data,constraints) then return error
8:    patches.delete(id)
9: return request
---

TamperProof maintains two global variables shared by all of these algorithms: patches and a cache for JavaScript constraints (not shown). Patches is a hash table keyed on patchIDs that stores the patch for each active patchID. All three algorithms access patches. TamperProof-from User uses patches to check if submitted data satisfies the necessary constraints. AnalyzeClient stores a new patch in patches. TamperProof-to User implicitly updates patches so that all of the patchIDs added to an outgoing webpage have (empty) entries in patches to ensure TamperProof knows those patchIDs are valid.

The cache for JavaScript constraints (not shown) is a hash table keyed on JavaScript signatures that stores the constraints corresponding to those signatures. analyzeClient is the only one to manipulate that cache. When analyzeClient is invoked, it extracts the JavaScript signature from the webpage and relies on another routine codeAnalysis to do the actual analysis. That routine first consults the JavaScript cache to see if the constraints for the JavaScript have already been extracted and if so simply adds those constraints to the result of the HTML constraint extraction; otherwise, it extracts the constraints from the JavaScript and updates the cache.

E. Evaluation

Implementation.

In one embodiment, the TamperProof tool is implemented by extending No Forge (a server-side proxy for preventing XSRF attacks) with 600 lines of PHP and 200 lines of Perl to include the algorithms TamperProof-to User and TamperProof-from User. Checking that an input's data satisfies a form's Value constraints is performed by a Perl script created to check exactly those constraints. The code to generate the Perl script for a given set of constraints is 1K lines of Lisp code. The implementation of AnalyzeClient is 5K lines of JavaScript code and 2K lines of Java code.

Applications.

Testing was performed of 10 medium to large PHP web applications that contained 49 parameter tampering vulnerabilities. TamperProof Table 1 provides background information on these applications: application, lines of code, number of file, functionality, and exploits (described in more details below). The test suite was deployed on a virtual machine (2.4 GHz Intel dual core, 2.0 GB RAM) running Ubuntu 9.10 with the LAMP application stack and was connected via a local area network to the client (2.45 Ghz Intel quad core, 4.0 GB RAM) running Windows XP.

TABLE 1

Applications & Attack Results

| Application | Size (LOC) | Files | Use | Exploits (Patched/Total) |
|---|---|---|---|---|
| DcpPortal | 144.7k | 484 | Contnt Mgmt | 32/32 |
| Landshop | 15.4k | 158 | Real Estate | 3/3 |
| MyBloggie | 9.4k | 59 | Blog | 6/6 |
| Newspro | 5.0k | 26 | News Mgmt | 1/1 |
| OpenDB | 100.2k | 300 | Media Mgmt | 1/1 |
| PHPNews | 6.4k | 21 | News Mgmt | 1/1 |
| PHPNuke | 249.6k | 2217 | Contnt Mgmt | 1/1 |
| SnipeGallery | 9.1k | 54 | Img Mgmt | 2/2 |
| SPHPBlog | 26.5k | 113 | Blog | 1/1 |
| OpenIT | 146.1k | 455 | Support | 1/1 |

1. Effectiveness

For evaluating the effectiveness of TamperProof in preventing parameter tampering exploits, the system developed a wget-based shell script to generate HTTP requests to vulnerable web forms. The exact parameters needed to exploit each web form were manually provided to this automated script. This script was also manually given session cookies for forms that could only be accessed in authenticated sessions.

To test the correctness of the automated shell script, the tester tested each vulnerable web form without deploying Tamper-Proof. Each form with tampered parameters that was successfully submitted and processed by the server confirmed the existence of a vulnerability as well as proper implementation of the shell script. The testers then deployed TamperProof and re-tested all of these applications. The result of this testing is summarized in the 5th column of Table 1, which shows the number of exploits that were prevented along with total number of known exploits for each form. As shown by this table, TamperProof was able to defend 100% of the known exploits. Some of the exploits that represent the common types of vulnerabilities encountered include the following.

Tampering HTML Controls.

One of the applications is vulnerable to script injection through a tampered select input field. The root cause of this vulnerability is the server's failure to ensure that the submitted input be-longs to one of the select box options available to the client. TamperProof detects inputs that are outside their allowed value range and also prevents attacks that involve tampering with other types of form fields including hidden fields, checkboxes, radio buttons, and text fields.

Tampering JavaScript Validation.

Another of the applications fails to replicate the client-side validations en-forced by JavaScript on the server, allowing attackers to by-pass a regular expression check and avoid mandatory fields during submission of a registration form. TamperProof captures JavaScript validation during constraint extraction and is therefore able to generate the appropriate patch to prevent such attacks.

Workflow Attack.

Another application is susceptible to a Workflow attack that bypasses a CAPTCHA verification during the registration process. The application uses a hidden field in the form to control a user's registration progress. By tampering with this field, the CAPTCHA page can be skipped without affecting the registration process otherwise. TamperProof is able to prevent such Workflow attacks by rejecting tampered hidden field values.

Negative Tampering.

One of the tested applications suffers from a negative tampering vulnerability, which can lead to privilege escalation. During normal user registration, the application checks if a parameter, make_install_prn, has been submit-ted with a value of "1". When this is the case, the application grants admin rights to the new account. An attacker who adds this parameter value to her submission can register administrative users. TamperProof is capable of stopping this attack because it maintains a list of parameters that can be submitted for each form.

Security of TamperProof.

We also tested that the TamperProof solution itself could not be tampered with. To this end, the testers intercepted form submission in one of the applications from the test suite and conducted the following three attacks: (a) removed patchID, (b) replaced patchID in a form submission with a patchID from a prior submission, and (c) checked out two forms and swapped their patchIDs. The first two attacks were rejected as TamperProof either failed to find a patchID with the submitted form or the supplied patchID did not match any of the active patchIDs.

To test whether TamperProof protects again patchID swapping, the testers constructed a sample application that generated two forms, A and B, with the same fields: name and age. Form B forbids submission of empty values for both name and age, whereas form A forbids submissions where age is empty (i.e., validation for A is weaker than B).

The two forms were then accessed in two separate browser windows. Form B was then submitted the patchID for A and an empty name, a submission hat form B would normally disallow. TamperProof forwarded this request to the server, despite the fact that we tampered with the patchID. Even though this seems like a successful parameter tampering attack, the submission from B (which required parameter tampering) could just as easily been created by filling out form A. Hence, had TamperProof rejected the submission, it would have also stopped a user from legitimately filling out form A. The results from this experiment indicate that TamperProof allows requests that could be created without parameter tampering, but no more.

2. Performance

As TamperProof performs additional processing both when a server sends a form to a user and when the user submits data to the server, the testers measured the overheads introduced by TamperProof for a combination of these events: the round-trip time (RTT). The RTT for a form is the sum of (a) the time from when a user requests that form and receives it from the server and (b) the time from when a user submits form data and receives the reply. The time spent in filling out the form is not included in RTT.

To measure the overheads introduced by TamperProof in terms of RTT, the testers deployed both the client and server on a LAN, simulating the worst-case scenario where network latencies are minimal and therefore RTT is almost entirely server performance. They then measured the RTT for forms from each of our applications.

Figure 14:
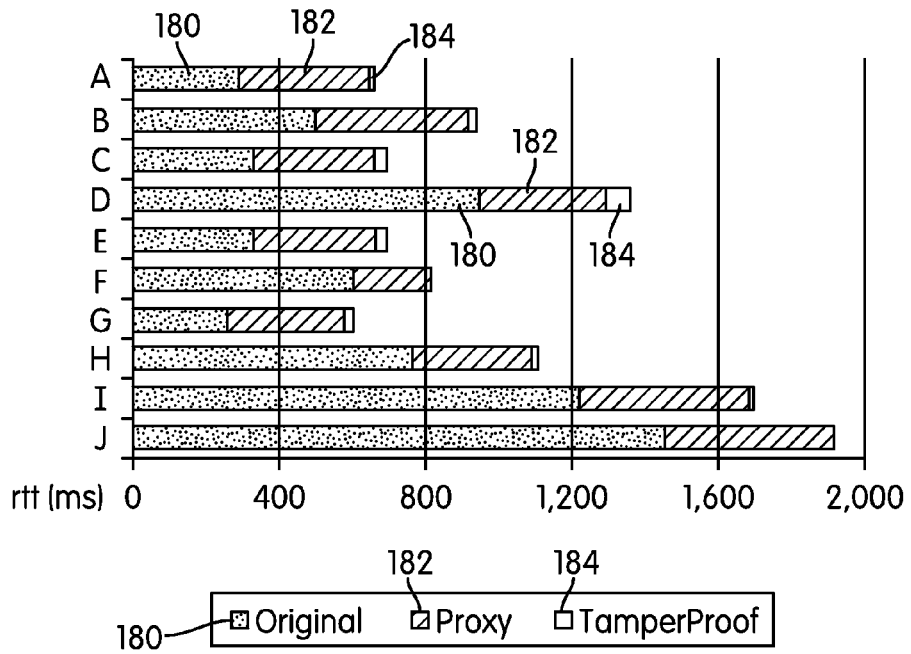
FIG. 14 illustrates an overhead in round trip times related to the TamperProof tool FIG. 13.

FIG. 14 shows the results related to RTT. For each application, the testers measured the RTTs for the original application, the application with a server-side proxy (without TamperProof) 182, and the application with the server-side proxy and TamperProof 184.

From the results, it was observed that the bulk of the overhead is introduced by the proxy (32%-126%) and that the additional overhead for TamperProof is merely 0%-4.8%. For this proof-of-concept experiment, the testers used an off-the-shelf proxy without any performance tuning. In addition, many organizations already use a proxy for various reasons (traffic monitoring, load balancing, intrusion detection, etc.), and TamperProof can be integrated into those proxies with minimal overheads. Alternatively, it is conceivable to integrate TamperProof with a single pur-pose proxy optimized for speed to improve the performance. Overall, we find the performance of TamperProof to be favorable.

Other Evaluation Details.

To understand the computational load added to a server by TamperProof (which influences throughput), the testers measured the processing times of TamperProofs internal components. For each application, TamperProof Table 2 breaks down the processing times of the three ore components: augmenting the form with patchID (Column 3), extracting constraints with and without a caching strategy (Column 4), and validating inputs (Column 5).

TABLE 2

TAMPERPROOF: Other Evaluation Results

| Application | Patch Formu. Compl. | Processing Time (s) | | |
|---|---|---|---|---|
| | | form updt. | const extra. (w/cache) | patch valid. |
| DcpPortal | 187 | 0.22 | 14.68 (0.50) | 0.01 |
| Landshop | 20 | 0.24 | 0.41 (0.41) | 0.01 |
| MyBloggie | 37 | 0.22 | 5.66 (0.39) | 0.01 |
| Newspro | 6 | 0.17 | 0.36 (0.36) | 0.01 |
| OpenDB | 266 | 0.22 | 0.52 (0.52) | 0.01 |
| PHPNews | 3 | 0.17 | 0.31 (0.31) | 0.01 |
| PHPNuke | 11 | 0.18 | 1.15 (0.50) | 0.01 |
| SnipeGallery | 11 | 0.16 | 1.47 (0.33) | 0.01 |
| SPHPBlog | 37 | 0.18 | 2.41 (0.38) | 0.01 |
| OpenIT | 17 | 0.22 | 0.64 (0.64) | 0.01 |

The form augmentation component run time averaged 197 ms, although this component can be further optimized. The formula extractor component consumed the most time during processing. Generally, HTML constraints were extracted at a constant time of about 300-600 ms, whereas JavaScript constraints were extracted in time proportional to the formula size (Column 2) and ranged between 0.31 s and 14.6 s. To help save time on the costly JavaScript analysis, the testers implemented the caching strategy previously described to reuse the analysis of frequently appearing JavaScript code. Caching reduces the server load by as much as an order of magnitude.

Column 4 of Tamper-Proof Table 2 shows caching improved times within parenthesis. This is an important savings in terms of server throughput (responses the server can generate per second). However, clients see little or no benefit from this, because constraint extraction usually coincides with the time the user is interacting with the form. Input validation proved to be the fastest component with average processing time of 10 ms.

Figure 15:
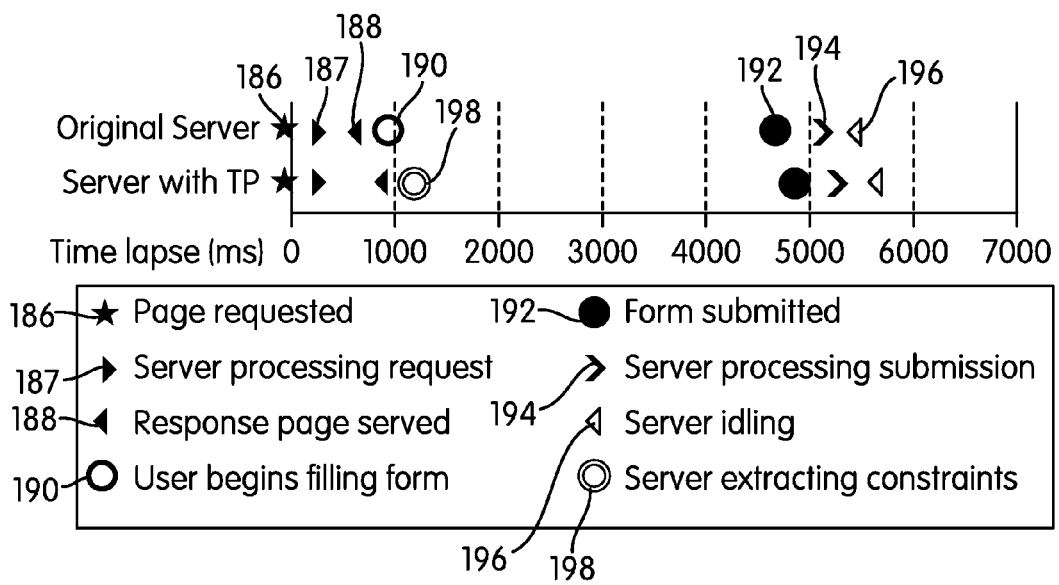
FIG. 15 shows a timeline depicting actual delay experienced by end users related to the TamperProof tool.

Even with the caching strategy in place, constraint extraction dominates over all other components of Tamper-Proof. However, this processing happens while the user is filling out the form. To illustrate, FIG. 15 shows a time lapse (i.e., delay) from the time when a client requests a page and receives the form to the time when the client submits the form and receives the reply. FIG. 15 includes page requested section 186, server processing request section 187, response page served section 188, user begins filling form section 190, form submitted section 192, server processing submission section 194, server idling section 196, and server extracting constrains section 198. The timeline demonstrates that there is a significant window of time when the client is filling out the form and the constraint extraction occurs without negatively impacting the user experience. Furthermore, when the constraint extraction is expensive, it usually means the constraints on the form are complex and therefore that users will not be able to quickly submit the form.

False Positives and False Negatives.

Tamper-Proof is guaranteed to not produce false negatives because the client code analysis engine used by TamperProof precisely models constraints implied by HTML code but conservatively approximates those implied by JavaScript. More specifically, this JavaScript engine conservatively assumes that all JavaScript event handlers relevant to validation were launched (which may not be the case in actual form submissions). This enables TamperProof patches to be complete with respect to the HTML and JavaScript validation embedded in a form and subsequently enables it to prevent exploitation of all parameter tampering vulnerabilities.

The TamperProof for false positives were tested by submitting valid forms with variations (e.g., filling out all fields as well as leaving optional fields empty). TamperProof did not reject any valid submissions and in our evaluation was free of false positives.

In theory, TamperProof may report false positives for the following reasons: (a) the JavaScript validation approximation computes stronger constraints than actually enforced in the form, e.g., two mutually exclusive JavaScript events when analyzed together may enforce overly strict constraints, or (b) the client JavaScript dynamically creates input fields that resemble a negative parameter tampering attack.

One seemingly additional case for false positives occurs when the server sanitizes and accepts malicious inputs that are rejected by client. Since TamperProof rejects inputs the server can safely handle, it may seem to be a false positive; however, the only way to submit such inputs is via parameter tampering, and hence only impacts malicious users.

Although the invention has been described in detail with reference to certain preferred embodiments, variations and modifications exist within the scope and spirit of one or more independent aspects of the invention as described.

What is claimed is:

1. A method for automatically detecting security vulnerabilities in a client-server application where a client is connected to a server, the method implemented by a computer having a processor and a software program stored on a non-transitory computer readable medium, the method comprising:
   automatically extracting, with the software program at the client, a description of one or more validation checks on inputs performed by the client;
   analyzing the server, with the software program by using the one or more validation checks on inputs performed by the client, to determine whether the server is not performing validation checks that the server must be performing; and
   determining that security vulnerabilities in the client-server application exist when the server is not performing validation checks that the server must be performing.

2. The method of claim 1, further comprising extracting, with the software program, a description of one or more validation checks on inputs performed by the server.

3. The method of claim 2, further comprising comparing the one or more validation checks performed by the client with the one or more validation checks performed by the server.

4. The method of claim 3, wherein comparing the one or more validation checks performed by the client with the one or more validation checks performed by the server includes determining whether validation performed by the server is less stringent than validation performed by the client.

5. The method of claim 1, further comprising generating, with the processor, a report related to the security vulnerabilities of the client-server application.

6. The method of claim 1, wherein analyzing the server further includes determining whether the server accepts inputs that are rejected by the one or more validation checks performed by the client.

7. The method of claim 6, wherein determining whether the server accepts inputs that are rejected by the one or more validation checks performed by the client includes performing a probabilistic analysis of the responses generated by the server.

8. The method of claim 7, wherein the probabilistic analysis includes:
   generating, with the software program, a first set of inputs that the server should accept and a second set of inputs that the server should reject;
   sending the first and the second sets of inputs to the server;
   ranking, with the software program, responses received from the server for the first set of inputs and responses received from the server for the second sets of inputs; and
   determining that the server is vulnerable when the server responses for the second set of inputs are similar to the server response for the first set of inputs.

9. The method of claim 6, wherein determining whether the server accepts inputs that are rejected by the one or more validation checks performed by the client includes automatically analyzing the server code.

10. The method of claim 9, wherein automatically analyzing the server code includes:
    generating, by using the description of the one or more validation checks performed by the client, one or more inputs that the server should accept;
    sending the one or more inputs that the server should accept to the server;
    analyzing, with the software program, whether the one or more inputs sent to the server perform a security sensitive operation on the server;
    extracting one or more validation checks performed by the server;

comparing the one or more validation checks performed by the server with the one or more validation checks performed by the client;

determining that a security vulnerability exits when the validation performed by the server is less stringent that the validation performed by the client; and generating, with the software program, one or more inputs that the server must reject.

11. The method of claim 1, wherein the client-server application is a web application.

12. The method of claim 1, wherein the client-server application is a mobile application.

13. The method of claim 1, wherein the security vulnerabilities of the client-server application include parameter tampering.

14. The method of claim 2, wherein the one or more validation checks on inputs performed by the server are extracted from a database connected to the server.

15. The method of claim 1, further comprising preventing parameter tampering attacks on a running client-server application by enforcing, with the software program, the one or more validation checks on inputs extracted from the client on each input that is submitted to the server.

16. A system for automatically detecting security vulnerabilities in a client-server application, the system comprising:
a client connected to a server; and
a computer having a processor and a software program stored on a non-transitory computer readable medium, the software program being operable to:
automatically extract, at the client, a description of one or more validation checks on inputs performed by the client,
analyze the server, by using the one or more validation checks on inputs performed by the client, to determine whether the server is not performing validation checks that the server must be performing, and
determine that security vulnerabilities in the client-server application exists when the server is not performing validation checks that the server must be performing.

17. The system of claim 16, wherein the software program is further operable to extract a description of one or more validation checks on inputs performed by the server.

18. The system of claim 17, wherein the software program is further operable to compare the one or more validation checks performed by the client with the one or more validation checks performed by the server.

19. The system of claim 18, wherein comparing the one or more validation checks performed by the client with the one or more validation checks performed by the server includes determining whether validation performed by the server is less stringent than validation performed by the client.

20. The system of claim 16, wherein the software program is further operable to generate, with the processor, a report related to the security vulnerabilities of the client-server application.

21. The system of claim 16, wherein the software program is further operable to determine whether the server accepts inputs that are rejected by the one or more validation checks performed by the client.

22. The system of claim 21, wherein the software program is further operable to perform a probabilistic analysis of the responses generated by the server.

23. The system of claim 22, wherein during the probabilistic analysis the software program is operable to:
generate a first set of inputs that the server should accept and a second set of inputs that the server should reject;
send the first and the second sets of inputs to the server;
rank responses received from the server for the first set of inputs and responses received from the server for the second sets of inputs; and
determine that the server is vulnerable when the server responses for the second set of inputs are similar to the server response for the first set of inputs.

24. The system of claim 21, wherein the software program is further operable to automatically analyze the server code.

25. The system of claim 24, wherein during the automatic inspection of the server code the software program is operable to:
generate, by using the description of the one or more validation checks performed by the client, one or more inputs that the server should accept;
send the one or more inputs that the server should accept to the server;
analyze whether the one or more inputs sent to the server perform a security sensitive operation on the server;
extract one or more validation checks performed by the server;
compare the one or more validation checks performed by the server with the one or more validation checks performed by the client;
determine that a security vulnerability exits when the validation performed by the server is less stringent that the validation performed by the client; and
generate, with the software program, one or more inputs that the server must reject.

26. The system of claim 17, wherein the one or more validation checks on inputs performed by the server are extracted from a database connected to the server.

27. The system of claim 16, wherein the system is further operable to prevent parameter tampering attacks on a running client-server application by operating the software program to enforce the one or more validation checks on inputs performed by the client on each input that is submitted to the server.

28. The system of claim 27, wherein the software program is further operable to:
generate a patch by analyzing a client side code of each client generated by the application;
use the patch to prevent parameter tampering attempts when the client submits inputs to the server.

29. A method for preventing parameter tampering attacks on a running client-server application where the client is connected to the server, the method implemented by a computer having a processor and a software program stored on a non-transitory computer readable medium, the method comprising:
automatically extracting, with the software program at the client, a description of one or more validation checks on inputs performed by the client; and
enforcing the one or more validation checks on inputs performed by the client on each input that is submitted to the server.

30. The method of claim 29, further comprising:
generating a patch by analyzing a client side code of each client generated by the application; and
using the patch to prevent parameter tampering attempts when a client submits inputs to the server.

31. The method of claim 30, wherein generating the patch includes:
intercepting server's communication with the client;
inserting a unique identifier in the client;
automatically extracting, with the software program, a description of one or more validation checks on inputs performed by the client;

associating the unique identifier with the description of one or more validation checks on inputs performed by the client; and creating a patch for the client, wherein the patch includes the unique identifier with the description of one or more validation checks on inputs performed by the client.

32. The method of claim 31, wherein prevent parameter tampering attempts includes:

intercepting inputs submitted by the client before reaching the server;

checking whether the unique identifier exists and matches the client; and checking whether the inputs satisfy the associate description of one or more validation checks on inputs performed by this client.

* * * * *